(12) United States Patent
Wilson et al.

(10) Patent No.: US 9,643,229 B2
(45) Date of Patent: May 9, 2017

(54) METHOD AND APPARATUS FOR MAKING AEROSOL CANS FOR METERED DOSE INHALER

(75) Inventors: Paul A. Wilson, Clitheroe (GB); Mark Bolton, Blackburn (GB); Derek A. Robinson, Clitheroe (GB); James E. Ribordy, South Beloit, IL (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 211 days.

(21) Appl. No.: 13/876,486

(22) PCT Filed: Oct. 19, 2011

(86) PCT No.: PCT/US2011/056871
§ 371 (c)(1),
(2), (4) Date: Mar. 28, 2013

(87) PCT Pub. No.: WO2012/054592
PCT Pub. Date: Apr. 26, 2012

(65) Prior Publication Data
US 2013/0216333 A1    Aug. 22, 2013

Related U.S. Application Data

(60) Provisional application No. 61/405,473, filed on Oct. 21, 2010.

(51) Int. Cl.
*B21D 22/00* (2006.01)
*B21D 51/26* (2006.01)
*B23D 31/00* (2006.01)
B23D 19/04 (2006.01)
B65D 83/38 (2006.01)

(52) U.S. Cl.
CPC ......... *B21D 22/00* (2013.01); *B21D 51/2615* (2013.01); *B23D 31/001* (2013.01); *B21D 51/2692* (2013.01); B23D 19/04 (2013.01); B65D 83/38 (2013.01)

(58) Field of Classification Search
CPC ........ B21D 22/28; B21D 43/14; B21D 51/26; B21D 51/2615; B21D 51/2638; B21D 51/2692; B21D 17/04; B21D 22/00; B23D 19/04; B23D 31/001
USPC ..................... 72/94, 379.4, 405.03
See application file for complete search history.

(56) References Cited

U.S. PATENT DOCUMENTS

| | | | |
|---|---|---|---|
| 2,928,454 A * | 3/1960 | Laxo | B21D 17/04 72/94 |
| 3,033,264 A | 5/1962 | Henrickson | |
| 3,913,366 A * | 10/1975 | Nelsen et al. | 72/121 |
| 4,003,324 A * | 1/1977 | Tate et al. | 72/340 |
| 4,049,389 A | 9/1977 | Grinberg et al. | |
| 4,557,167 A * | 12/1985 | Cvacho | 82/47 |
| 4,563,887 A | 1/1986 | Bressan et al. | |
| 5,138,858 A | 8/1992 | Johnson et al. | |
| 5,245,848 A | 9/1993 | Lee, Jr. et al. | |
| 5,448,093 A | 9/1995 | Kusunoki et al. | |

(Continued)

FOREIGN PATENT DOCUMENTS

| | | |
|---|---|---|
| EP | 0 588 048 | 3/1994 |
| EP | 1 889 674 | 2/2008 |

(Continued)

*Primary Examiner* — Edward Tolan

(57) ABSTRACT

A method and apparatus for forming aerosol cans for metered dose inhalers.

9 Claims, 15 Drawing Sheets

(56) References Cited

U.S. PATENT DOCUMENTS

| | | | |
|---|---|---|---|
| 5,768,931 A * | 6/1998 | Gombas | 72/184 |
| 6,230,538 B1 | 5/2001 | Ribordy | |
| 6,434,997 B1 | 8/2002 | Ellis | |
| 7,003,999 B2 * | 2/2006 | Campo et al. | 72/94 |
| 7,818,987 B2 * | 10/2010 | Marshall | 72/94 |
| 7,886,894 B2 * | 2/2011 | Schill et al. | 198/459.2 |
| 7,905,130 B2 * | 3/2011 | Marshall | B21D 51/2615 72/104 |
| 8,037,728 B2 * | 10/2011 | Hosoi | 72/94 |
| 2007/0007294 A1 | 1/2007 | Jentzsch et al. | |
| 2007/0227218 A1 * | 10/2007 | Shortridge | 72/94 |
| 2008/0028817 A1 | 2/2008 | Ribordy | |
| 2008/0034823 A1 | 2/2008 | Frattini et al. | |
| 2008/0148801 A1 | 6/2008 | Olson et al. | |
| 2008/0308582 A1 | 12/2008 | Duffield | |

FOREIGN PATENT DOCUMENTS

| | | |
|---|---|---|
| WO | WO 83/02577 | 8/1983 |
| WO | WO 88/05700 | 8/1988 |
| WO | WO 96/29249 | 9/1996 |
| WO | WO 99/36204 | 7/1999 |
| WO | WO 2007/005564 | 1/2007 |
| WO | WO 2008/103629 | 8/2008 |

* cited by examiner

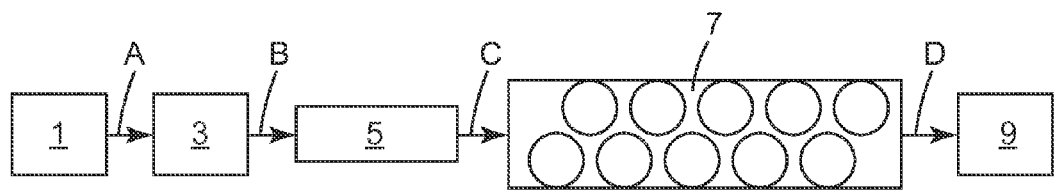
*Fig. 1*
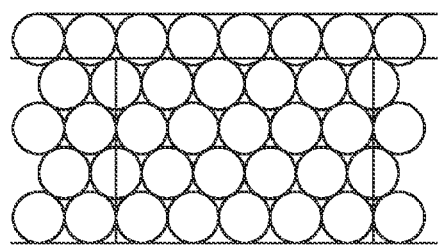
*Fig. 3*
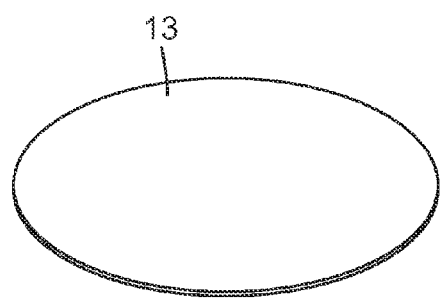 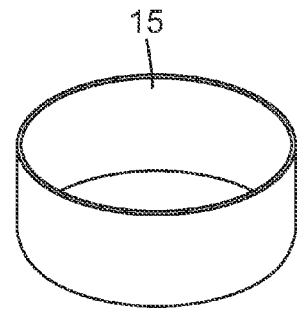
*Fig. 4A*  *Fig. 4B*

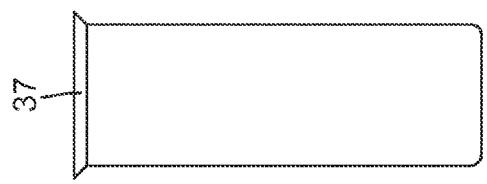
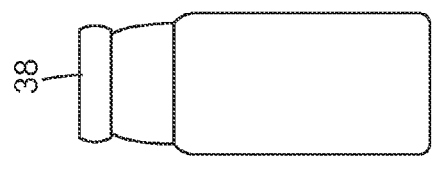
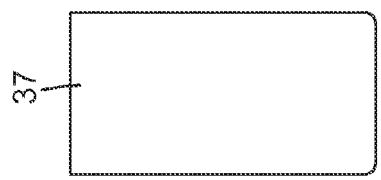
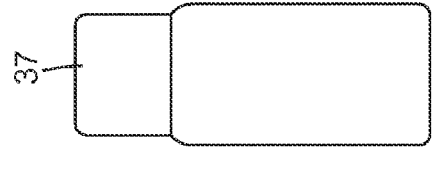
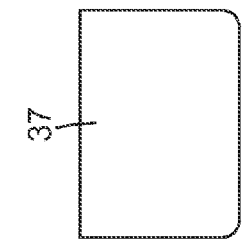

METHOD AND APPARATUS FOR MAKING AEROSOL CANS FOR METERED DOSE INHALER

CROSS REFERENCE TO RELATED APPLICATIONS

This application claims the benefit of U.S. Provisional Patent Application Ser. No. 61/405,473, filed Oct. 21, 2010, which is incorporated herein by reference in its entirety.

FIELD

This invention relates to a method and apparatus for forming aerosol cans for metered dose inhalers. More particularly, the invention concerns a method and apparatus for making aerosol cans from sheet metal, in particular aluminium or aluminium alloy, employing sequential forming operations. The invention is especially concerned with a method and apparatus for making aerosol cans, such as aluminium or aluminium alloy aerosol cans, that can be assembled with a valve to produce a container for dispensing a product for use in medicinal applications, in particular metered dose inhalers (MDIs) and more particularly pressurised metered dose inhalers (pMDIs).

BACKGROUND

Aerosol cans for MDIs in particular pMDIs normally possess a bead. The bead allows a metering means, in particular a metering valve, to be attached to the can by crimping a ferrule skirt of the metering means around the bead. Generally the can has a neck near the open end of the can, and the wall between the neck and the open end of the can curves outwardly and then inwardly to provide the bead. The neck typically is a short region having a small diameter (typically the smallest diameter of the can) suitable to house an 'O' ring of circular cross section, while the lower portion of the bead facilitates positioning of the 'O' ring. The upper portion of the bead facilitates sealing of the metering means to the open end of the can. For example when a metering valve is sealed to the open end via a gasket seal, the desired formation of a face seal acting against the open end of the can is facilitated by the top portion of the bead. To form the bead requires an operation in which the neck and the curved wall between the neck and the open end of the can are formed in a workpiece during the processing of the workpiece into a finished can.

It is known to produce cylindrical metal aerosol cans for MDIs, in particular pMDIs from sheet metal (such as aluminium or aluminium alloy) in a transfer press by cutting a circular blank and forming the blank through a series of sequential operations to obtain an aerosol can having the desired form and size. Such operations typically include drawing, cutting, re-coning, curling and beading and optionally debossing. The known transfer presses have a reciprocable transfer slide for moving the workpieces through a series of in-line locations at which the operations are performed by appropriate tooling at each location.

FIG. 20 shows an arrangement for performing a beading operation on a workpiece 501 in such transfer presses. A mandrel 503 which is slightly smaller than the workpiece 501 is positioned within the workpiece 501 and a roller 505 is brought up to and positioned against the workpiece 501 urging it against the mandrel 503 so as to form a bead in the workpiece 501 having the required shape.

Movement of the roller 505 is controlled by a linkage system generally indicated by reference numeral 507 to position the roller 505 with respect to the mandrel 503. The linkage system has arms 512,513 with respective pivots 504,506. The arms are linked by an adjustable rigid bar 510, and the movement of arm 513 is biased by a return spring 508. A rotatable drive shaft 509 for the transfer press is located under the transfer slide (not shown) and the linkage system 507 is operated by a cam 511 mounted on the drive shaft. The linkage system 507 extends from the underside of the transfer slide to the topside for moving the roller 505 towards and away from the mandrel 503 as the cam 511 rotates.

In use, the workpiece 501 is positioned to receive the mandrel 503 and the roller 505 is moved towards the mandrel 503 to clamp the workpiece 501 between cooperating profiles on the mandrel 503 and the roller 505 while the mandrel 503 and roller 505 rotate causing the workpiece 501 to be rolled between the mandrel 503 and the roller 505 to form the bead. Once the bead has been formed, the roller 505 is moved away from the mandrel 503 releasing the workpiece 501 so that the workpiece 501 can be separated from the mandrel 503 and moved to the next location.

The bead has to be accurately formed for subsequently attaching a valve to the finished can. The above-described linkage system 507 for the back and forth movement of the roller 505 is complicated and includes several elements pivotally connected to each other. As a result, the positioning of the roller 505 to form the bead can be affected by a number of factors affecting the set-up of the linkage system 507 which may result in beads being formed that are outside the tolerances required for attaching the valve. For example, temperature changes both in the ambient surroundings and caused by heat generated by operation of the press over a period of time can result in a change in dimensions of one or more of the elements due to thermal expansion/contraction that affects the set-up of the linkage system 507. Another factor potentially affecting the set-up of the linkage system 507 is wear in any of the pivotal connections of the linkage system. In addition, inaccuracies in positioning of the roller 505 may arise at least partially because drive gears for rotating the roller 505 are moved in and out of mesh during each rolling operation.

A further drawback of the known transfer presses is that only one workpiece is formed at each location and therefore while the press may perform different operations on several workpieces at the same time according to the position of the workpieces in the sequence of operations, there is a limit on the total number of workpieces that can be produced in a given period of time.

SUMMARY

The present invention has been made from a consideration of the foregoing and seeks to overcome or at least mitigate some or all of the drawbacks of the known transfer presses for producing aerosol cans.

Thus, it is a desired aim of the present invention to provide apparatus capable of forming an aerosol can to the specified accuracy for a medicinal dispensing product whilst increasing the number of aerosol cans which can be produced in a given period of time.

This aim may be achieved in some embodiments by providing an apparatus capable of working on more than one workpiece at each stage in the sequential forming operations whereby throughput may be increased to improve the number of aerosol cans that can be produced in a given period of time compared to the known transfer presses.

This aim may be assisted in some embodiments by the arrangements employed to carry out the forming operations at any of the stages, in particular, but not exclusively, the stages for performing the beading and trimming operations.

These and other aims, advantages and benefits of the invention will be apparent from the description hereinafter.

In a first aspect of the invention there is provided an apparatus for forming an aerosol can for a metered dose inhaler, the apparatus including a turret rotatable about a central axis and having a plurality of tool sets for carrying out a forming operation on a respective plurality of workpieces as the turret rotates, wherein each tool set is configured and arranged to move about said central axis as the turret rotates and wherein each tool set comprises two rotatably driven tools that are configured and arranged to carry out a beading operation or a trimming operation on a workpiece.

In one embodiment, the turret is a beading turret wherein said two rotatably driven tools of each tool set of the plurality of tool sets of the turret are configured and arranged to carry out a beading operation, in particular each tool set includes a pressure wheel tool and a mandrel tool for performing a beading operation on a workpiece by rotatively nipping the workpiece between complementary profiles of the tools.

In another embodiment, the turret is a trimming turret wherein said two rotatably driven tools of each tool set of the plurality of tool sets of the turret are configured and arranged to carry out a trimming operation, in particular each tool set includes a cutting wheel tool and a spindle tool for performing a trimming operation on a workpiece by rotatively cutting the workpiece between the tools.

Preferably, the tool sets are offset in the direction of rotation of the turret, preferably with a uniform spacing, so that, as the turret rotates, the forming operations are staggered.

In both embodiments, the rotatably driven tools of each tool set are preferably mounted for rotation about axes parallel to each other and to the central axis and the tools are relatively movable in a direction transverse to the central axis only for performing a beading operation or a trimming operation on a workpiece according to whether the turret is beading turret or a trimming turret.

Preferably, each tool set is co-operable with a stationary cam that extends about the turret for controlling relative movement of the tools for performing a beading operation or trimming operation on a workpiece.

Preferably, the tool sets are positioned in the vicinity of, preferably adjacent to, the stationary cam such that the stationary cam and tools of each tool set are arranged in a generally horizontal plane and the cam is configured to control relative movement between the tools of each tool set radially with respect to the central axis of the turret. In this way, the cam acts on the tools over a short distance, ideally just sufficient to provide any clearances for functional movement and for supporting structure and may be no more than a few centimeters. Reducing the distance between the cam and the tools may allow a more positive and precise control of the relative position of the tools during a beading operation or a trimming operation compared to the complex linkage system employed in the prior art.

The tools of each tool set may both be movable towards and away from each other under the control of respective cams for performing a beading operation or a trimming operation. Alternatively, both tools can be caused to move towards and away from each other by operating one tool off a cam follower and by operating the other tool off a rocker or wheel that has a pivot fixed relative to the turret where the role of the rocker or wheel is to reverse the direction that the tool moves in relation to the cam.

More, preferably, however, the position of one of the tools is fixed relative to the central axis of the turret and the position of the other tool is movable relative to the central axis of the turret towards and away from the fixed tool under the control of the cam for performing a beading operation or a trimming operation. The fixed tool may be the radially inner tool with the cam positioned outboard of the radially outer tool for moving the outer tool relative to the inner tool. Alternatively, the fixed tool may be the radially outer tool with the cam positioned inboard of the radially inner tool for moving the inner tool relative to the outer tool. A cam follower for the movable tool may co-operate with an axially directed surface of the cam but more preferably co-operates with a radially directed surface of the cam such that the cam force is directly applied in the direction of movement of the movable tool.

Preferably, the turret has drive means for rotating the tools of each tool set. The drive means may comprise a drive ring that surrounds the turret and each tool set has a respective drive shaft for each tool that is driven by the drive ring, preferably at an upper end of the drive shafts. The drive shafts for the tools of each tool set are preferably configured to accommodate relative movement of the tools while maintaining the rotational axes of the tools parallel to each other and to the central axis of the turret. For example, one or both drive shafts may include one or more flexible couplings to accommodate angular and/or axial movement of the drive shafts for driving the tools off a common drive such that their distance separation can be freely varied without the imprecision of gears going in and out of mesh. Such flexible coupling(s) may comprise a universal joint, or could be provided by a shaft made from a tough flexible material, or from a bundle of fibres of material clamped at each end. However, it may be possible for the rotational axes of the tools to be non-parallel and within a plane that also contains the relative direction of movement of the drive shafts.

Preferably, the tools of each tool set are mounted at a lower end of the drive shafts that are rotatably received in respective tool blocks defining the rotational axes of the tools. In a preferred embodiment, one of the tool blocks is fixed and the other tool block is movable relative to the fixed tool block for moving the tools towards and away from each other. Preferably, the tool blocks are guided for such movement by engagement of co-operating formations on the blocks, for example one tool block may have one or more guide pins received in openings in the other guide block such that the movable tool block can slide back and forth relative to the fixed tool block by engagement of the pins in the slots. Guiding the tool blocks for relative movement may assist positive and precise control of the position of the tools. Preferably, the tool blocks are biased to separate the tools, for example by one or more springs acting between the tool blocks so that the cam follower for the movable tool is urged to engage the cam. Preferably, the cam follower for the movable tool is adjustable to vary the distance the movable tool is moved towards the fixed tool against the biasing of the spring(s) between the tool blocks.

Preferably, one of the tools of each tool set is positioned within the workpiece (the internal tool) and the relative movement between the tools brings the other tool into contact with an outer surface of the workpiece (the external tool) to trap locally the wall of the workpiece between the tools for carrying out a beading operation or a trimming operation on the wall of the workpiece. Preferably, the internal tool is the fixed tool and the external tool is the movable tool. The internal tool may be a mandrel, spindle or the like configured to provide support for the wall of the workpiece at least in the region where the wall is trapped between the tools. The outer tool may be a wheel arranged to contact the outer surface of the workpiece at the peripheral edge of the wheel. The peripheral edge may be shaped to carry out a beading operation or a trimming operation. It may be beneficial for co-operating profiles of the tools to run at the same velocity to reduce or eliminate slippage against the workpiece that may result in less control over how much rotation the workpiece undergoes during a beading operation or a trimming operation. Such equal velocities may be achieved by selected gearing of the drive shafts for a complementary pair of tools, particularly if the drive for both tools derives from a single motor. Alternatively, the equal velocities could be achieved by using encoders on separate motors or analogue gearing.

Preferably, each tool set has an associated lifting module arranged to receive a workpiece loaded into the turret and to raise the workpiece to position the internal tool of the tool set within the workpiece for a beading operation or a trimming operation. After the beading operation or trimming operation, the lifting module is arranged to lower the workpiece to clear the internal tool so that the workpiece can be unloaded from the turret. The lifting module may be co-operable with a stationary cam that extends about the turret for controlling movement of the lifting module to raise and lower the workpiece. The lifting module may include a platform mounted at the upper end of a shaft that extends parallel to the central axis of the turret and has a cam follower at the lower end that engages the cam, preferably an upper surface of the cam that is profiled to raise and lower the lifting module as the turret rotates about the central axis relative to the cam.

Preferably, the lifting module of each tool set has means for receiving and aligning a workpiece loaded into the turret with the internal tool so that the internal tool is received within the workpiece when the workpiece is raised by the lifting module. The receiving and aligning means may comprise a back stop on the platform having a channel or groove into which the workpiece is loaded so as to position the workpiece under the internal tool. The back stop may be fixed relative to the platform so as to maintain contact with the workpiece when the workpiece is held between the tools or it may be movable relative to the platform so as not to contact the workpiece when the workpiece is held between the tools. Where the back stop is movable, it may be co-operable with a stationary cam that extends about the turret for controlling movement of the backstop. The back stop may be mounted at the upper end of a shaft that extends generally parallel to the central axis of the turret and is pivotally connected to a cam follower at the lower end that engages the cam, preferably an upper surface of the cam that is profiled to pivot the shaft as the turret rotates about the central axis relative to the cam to move the back stop. Preferably, the back stop positions the workpiece on a rotatable part of the platform, for example a disc rotatably mounted in the upper surface of platform. The disc rotates with and thereby reduces resistance to rotation of the workpiece during a beading operation or a trimming operation.

In one embodiment the turret is a beading turret, and the apparatus further comprises one or more further rotatable turrets, each further turret comprising at least one tool set, preferably a plurality of tool sets, for carrying out a forming operation on a corresponding plurality of workpiece as the turret rotates, said further turrets and beading turret being arranged for transfer of the workpiece between the turrets in sequence.

Said at least one tool set, preferably said plurality of tool sets, of the one or more further turrets may be selected from the group consisting of a drawing tool set, de-bossing tool set, trimming tool set, re-coning tool set and curling tool set.

In a preferred embodiment, the apparatus comprises at least four rotatable turrets including in sequence a trimming turret, a re-coning turret, a curling turret and a beading turret, and at least three transfer members for transferring the workpiece between turrets in said sequence.

In a more preferred embodiment, the apparatus comprises at least five rotatable turrets including in sequence a drawing turret, a trimming turret, a re-coning turret, a curling turret and said beading turret, and at least four transfer members for transferring the workpiece between turrets in said sequence.

In a second aspect of the invention, there is provided a method of forming an aerosol can for a metered dose inhaler, the method including the steps of providing a turret rotatable about a central axis, providing the turret with a plurality of tool sets for carrying out a forming operation on a respective plurality of workpieces as the turret rotates, arranging each tool set to move about said central axis as the turret rotates and providing each tool set with two rotatably driven tools arranged to carry out a beading operation or a trimming operation on a workpiece.

The method preferably includes the step of moving the tools towards each other for carrying out a beading operation or a trimming operation where a portion of the workpiece is locally sandwiched between the tools and rotation of the tools causes the workpiece to rotate to present a new portion of the workpiece to the tools until the operation is completed.

The method may employ any of the features of the turret according to the first aspect of the invention.

In a third aspect of the invention, there is provided apparatus for forming an aerosol can, the apparatus including a plurality of rotatable turrets arranged for transfer of a workpiece between said turrets in sequence, each turret having at least one tool set for carrying out a forming operation on a workpiece as the turret rotates, and means for transferring a workpiece between turrets in said sequence, wherein at last one turret is provided with a beading tool set or a trimming tool set.

In some embodiments, each turret has a plurality of tool sets operable to carry out forming operations on a plurality of workpieces as the turret rotates. The tool sets may be offset in the direction of rotation of the turret so that, as the turret rotates, the forming operations are staggered. The tool sets may be the same so that, as the turret rotates, the same forming operation is carried out on all the workpieces. Different turrets may have different tool sets for carrying out different forming operations. Providing multiple tool sets may increase production rates compared to an in-line press while offsetting the tool sets to stagger the forming operations may reduce noise levels.

The apparatus may be employed to produce metal cans for use in the manufacture of pharmaceutical aerosols or metered dose inhalers. In such application, the rotatable turrets may include tool sets for carrying out forming operations including some or all of drawing, trimming, re-coning, curling, beading a workpiece to produce a can having the required shape and configuration for assembly with a valve.

Preferably, each tool set on at least some of the turrets has an associated lifting module arranged to receive a workpiece at an inlet position, raise the lifting workpiece for the tool set to carry out the forming operation and lower the workpiece for ejection at an outlet position as the turret rotates. Preferably, movement of the lifting module is controlled by a cam system as the turret rotates.

Preferably, each tool set on at least some of the turrets is operable by a cam system as the turret rotates. The lifting module cam system and the tool set cam system are preferably synchronised to position the workpiece for the tool set to carry out the forming operation.

Where provided, a beading tool set preferably comprises a mandrel on which the workpiece is located by the lifting module and a pressure wheel that is radially movable relative to the mandrel to shape the sidewall of the workpiece between co-operating profiles on the pressure wheel and mandrel to form the bead.

Preferably, the pressure wheel and mandrel are rotatable and the rotational speeds are controlled to reduce or eliminate frictional slippage during the beading operation.

Where provided, a trimming tool set preferably comprises a spindle on which the workpiece is located by the lifting module and a cutting wheel that is radially movable relative to the spindle to cut the sidewall of the workpiece.

Preferably, the cutting wheel and spindle are rotatable and the rotational speeds are controlled to reduce or eliminate frictional slippage during the trimming operation.

Preferably, each turret is driven by a motor. In a preferred arrangement, the turrets are arranged in pairs with each pair being driven by a common motor. Preferably the turret motors are synchronised. The turret motors may comprise stepper motors.

A control system may be employed to control any aspect of the operation of the apparatus. The control system may include an electronic controller including a programmable microprocessor for inputting control data and optionally a read only memory and/or a random access memory for storing data. The control system may be used to synchronise the motors driving the turrets and optionally to synchronise operation of the press to any other parts of the apparatus. The control system may be employed to monitor the positions of a particular workpiece at different stages as it traverses the apparatus. The control system may be configured to enable workpieces to be fed to one or more specific tool sets on the first turret, and thereafter to the corresponding tool sets on each subsequent operational turret. The control system may include a control panel for inputting data and/or for controlling and/or monitoring operation of the apparatus. A hand held controller may be used for controlling operation of the apparatus, for example to start and stop the press and to allow an operator to control the turrets locally, for example during maintenance or repair, so that individual turrets can be rotated. The control system may be operable to re-set the press and return the turrets to a "start position" after repair or maintenance work has been carried out so that the turrets are synchronised with each other and with the transfer wheels to avoid mis-feeds of workpieces when the apparatus is re-started.

In yet another aspect of the invention, there is provided a method of forming an aerosol can, the method comprising the steps of providing a plurality of rotatable turrets, arranging said turrets for transfer of a workpiece between said turrets in sequence, loading a workpiece into a first said turret in said sequence and carrying out a forming operation on said workpiece as said turret rotates, transferring said workpiece from said first turret to a successive turret in said sequence and carrying out a forming operation on said workpiece as said turret rotates, and unloading said workpiece from a final said turret in said sequence; wherein a forming operation at one of said turrets in said sequence comprises a beading operation or a trimming operation.

In some embodiments, each turret is configured to carry out forming operations on a plurality of workpieces as the turret rotates. Thus, each turret may have a plurality of tool sets operable to carry out forming operations on several workpieces as the turret rotates. The tool sets may be offset in the direction of rotation of the turret so that, as the turret rotates, the forming operations are staggered. The tool sets may be the same so that, as the turret rotates, the same forming operation is carried out on all the workpieces. Different turrets may have different tool sets for carrying out different forming operations. Providing multiple tool sets may increase production rates compared to an in-line press while offsetting the tool sets to stagger the forming operations may reduce noise levels.

Other features, benefits and advantages of the invention will be apparent from the following description of exemplary embodiments with reference to the accompanying drawings in which like reference numerals are used to indicate corresponding parts.

BRIEF DESCRIPTION OF THE DRAWINGS

FIG. 1 is a block diagram showing the stages in a method for making aerosol cans according to the invention:

FIG. 3 shows a cutting pattern for blanks for making aerosol cans according to the invention;

FIGS. 4A and 4B show a blank and a cup produced from the blank for making a can according to the invention;

FIGS. 6A to 6H show workpieces at various stages in the forming operation for producing finished cans from the cups of FIG. 4b;

DETAILED DESCRIPTION

Figure 2:
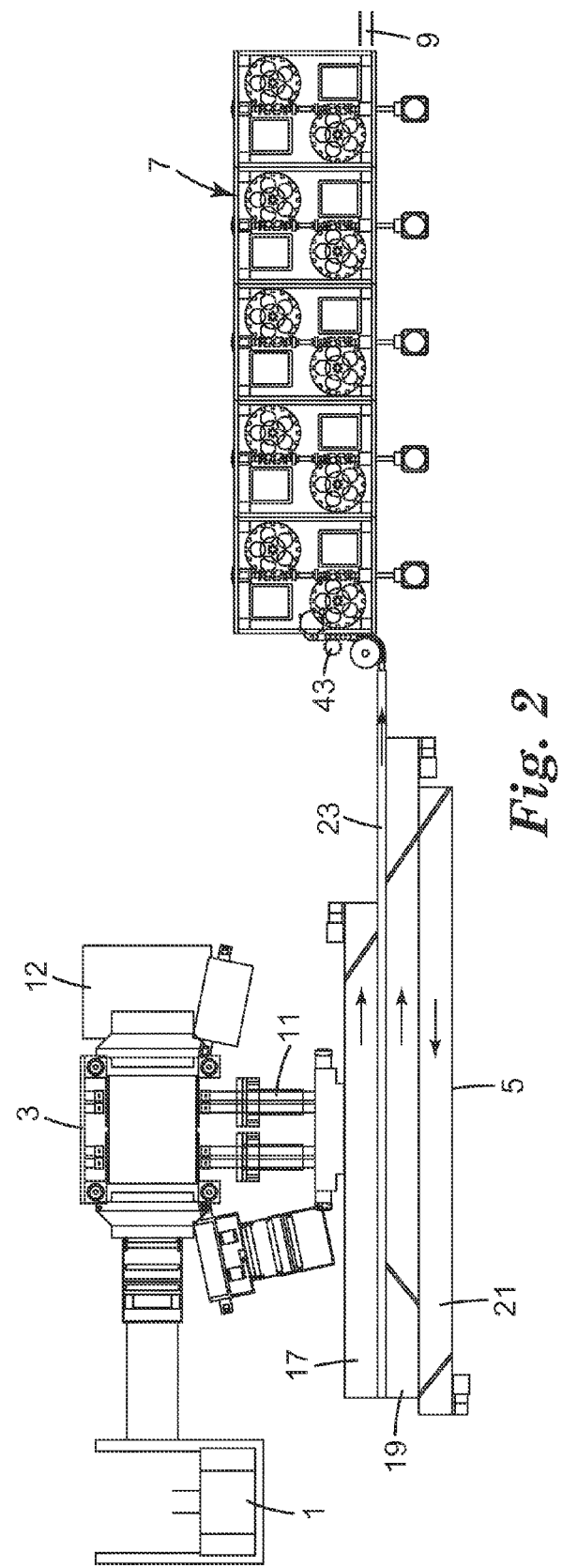
FIG. 2 is a plan view of apparatus according to the invention for carrying out the process of FIG. 1.

In the following description, a general overview of a method and an apparatus employing a multi-stage rotary press for making aerosol cans according to the invention is first provided followed by a more detailed description of parts of the rotary press.

The aerosol cans may be made of aluminium, stainless steel or other metals or alloys but are preferably aluminium or an alloy thereof. The aerosol cans are typically configured for assembly with a valve for use in pharmaceutical aerosols or metered dose inhalers, in particular pressurised metered does inhalers.

In use, the aerosol cans are generally either fitted with an 'O' ring that is assembled around the neck of the can to form a seal with the ferrule skirt of a valve crimped thereon, or they are manufactured to form a seal with a gasket seated in the ferrule of the aerosol valve. In the latter case, it is the edge of the open end of the can that is pressed into the gasket to form the seal. It is important to form a good seal in either case to prevent propellant leakage and water ingress, considering that weight of contents are small and the storage periods long compared with many other types of product.

A block diagram showing the stages in a method for making an aerosol can according to the invention is shown in FIG. 1. In a first stage indicated by arrow A, a sheet of stock material is fed from a flat stock decoiler 1 to a cupping machine 3 that cuts the sheet material to form circular blanks having a pre-determined diameter for the required size of the finished can to be produced and then draws the blanks to produce shallow cups having an annular base and a cylindrical wall from which the eventual cans are to be produced. In a second stage indicated by arrow B, the cups are transferred from the cupping machine 3 to a cup accumulator 5 where the cups are stored. In a third stage indicated by arrow C, the cups are transferred from the accumulator 5 to a multi-stage rotary press 7 that converts the cups to the required shape of the finished cans. In a fourth stage indicated by arrow D, the finished cans are transferred from the rotary press 7 to storage bins, possibly via a discharge conveyor 9. As used herein the term "workpiece" is used to denote a part which is loaded into a turret and may take various forms according to the stage in the method and apparatus.

An apparatus for carrying out the method described above is shown in FIG. 2 and includes decoiler 1, cupping machine 3, accumulator 5, rotary press 7 and discharge conveyor 9.

The decoiler 1 may be of a conventional design for storing the sheet material as a roll stock that is unwound and delivered to the cupping machine 3 for cutting and drawing to produce cups for delivery to the accumulator 5 on conveyors 11. The waste material from the cutting operation is preferably collected in a bin 12. FIG. 3 shows a cutting pattern for the blanks and, as can be seen, the pattern is configured to minimise waste when cutting the blanks. It will be understood that other cutting patterns may be employed as determined by factors such as the size of the blanks. FIG. 4A shows a typical blank 13 and FIG. 4B shows a cup 15 produced from the blank 13 in the cupping machine 3. The blank 13 is circular and the cup 15 has a circular base of reduced diameter and a short cylindrical side wall. It will be understood that the shape and/or dimensions of the blank 13 and cup 15 may be altered as necessary to produce the required shape and dimensions of finished can.

The accumulator 5 comprises multiple (in this case three) elongate conveyor belts 17, 19, 21 arranged side-by-side to form a moving table for storing the cups 15 from the cupping machine 3. Conveyor belts 17, 19 rotate in the same direction so that the cups 15 are advanced towards an outlet channel 23 for delivery of the cups 15 to the rotary press 7 in a single line. Conveyor belt 21 rotates in the opposite direction so that cups 15 that do not enter the outlet channel 23 are returned to the back of the accumulator 5 to be advanced again. In this way the cups 15 are continuously circulated around the accumulator 5 and are pushed into the outlet channel 23 in a random manner to keep the outlet channel 23 full. The accumulator 5 provides a store for cups 15 from the cupping machine 3 to smooth out variations between the rate at which the cups 15 are formed and the rate at which the cups 15 are transferred to the rotary press 7. It will be understood that the number and arrangement of the conveyor belts 17, 19, 21 may be varied. Alternative constructions for the accumulator 5 may also be employed.

Figure 5:
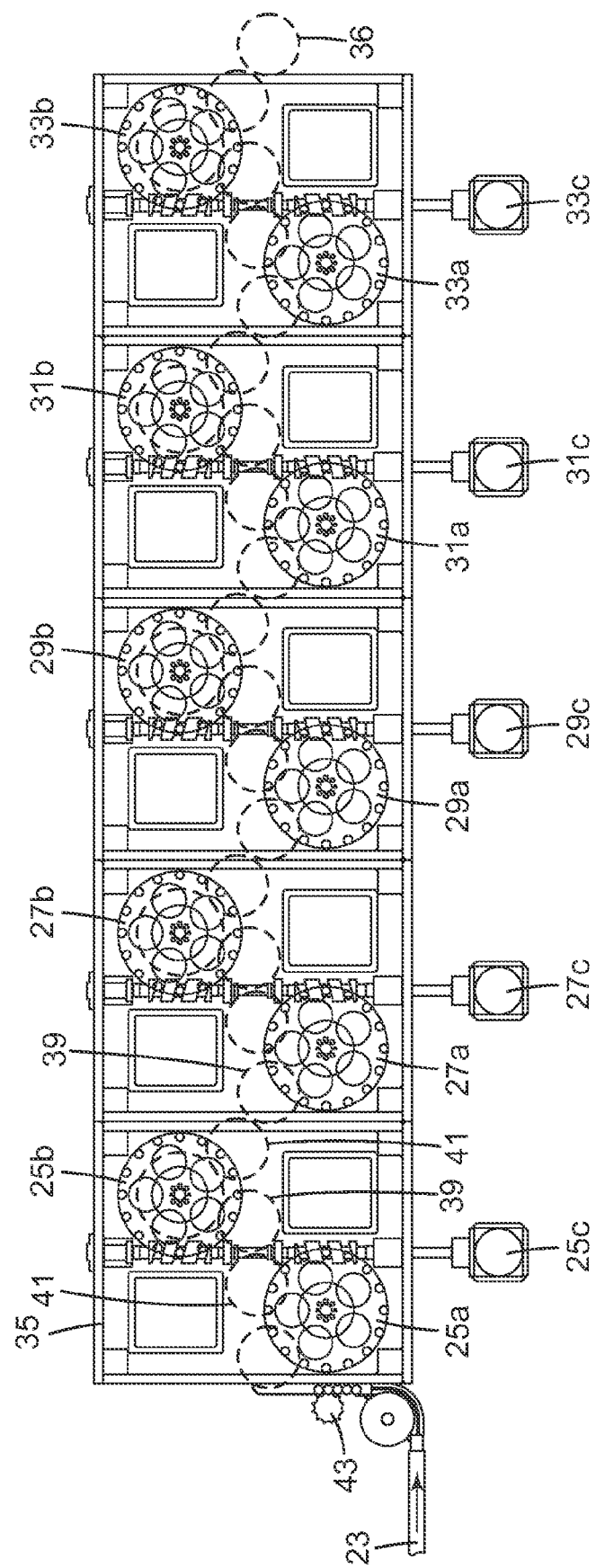
FIG. 5 is a plan view, to an enlarged scale, of the rotary press shown in FIG. 2.

The rotary press 7 is shown in more detail in FIG. 5 and comprises multiple (in this case ten) rotatable turrets arranged in five pairs 25a,25b; 27a,27b; 29a,29b; 31a,31b; 33a,33b in a rigid frame 35. Cups 15 from the accumulator 5 are fed via a pace wheel 43 (FIG. 2) to turret 25a of the first pair of turrets and then transferred in sequence from turret 25a to turret 25b, from turret 25b to turret 27a, from turret 27a to turret 27b, from turret 27b to turret 29a, from turret 29a to turret 29b, from turret 29b to turret 31a, from turret 31a to turret 31b, from turret 31b to turret 33a, and finally from turret 33a to turret 33b of the last pair of turrets. Each turret carries out a forming operation so that cups 15 received from the accumulator 5 are converted to finished cans in a series of stages. The finished cans from turret 33b pass through a checking station 36 where one or more selected cans may be sampled for dimensional measurements to be performed against a specification before the other cans are transferred to a storage bin (not shown). For convenience, the term "workpiece" is used in the following description of the various stages of the rotary press and may include cups, part formed cans and finished cans according to the context.

Each turret is rotatable about a central axis and comprises multiple (in this embodiment eight) tool sets uniformly spaced apart around the central axis of the turret so that each turret can work simultaneously on several workpieces (in this embodiment eight) that are engaged by tool sets as the turret rotates. It will be understood that in other embodiments the number of tool sets on the turrets may be changed. During each complete revolution of the turret, each tool set receives a workpiece at an inlet position and carries out a forming operation on the workpiece before releasing the workpiece at an outlet position and then returning to the inlet position to receive another workpiece.

The tool sets on a given turret are preferably the same. The tool sets vary from one turret to another whereby the turrets can carry out a series of forming operations as workpieces pass through the rotary press from one turret to the next to convert the cups produced by the cupping machine to finished cans.

In this embodiment, the tool sets on the turrets 25a, 25b and 27a, 27b comprise tools such as a drawing punch that descends through a draw sleeve to force the workpiece into a die to reduce the diameter and increase the height of the workpiece. The punch and sleeve ascend together, and the sleeve acts to strip the workpiece from the punch. In this embodiment, the diameter of the workpiece is reduced to the required diameter of the main body of the finished cans in four stages (FIGS. 6A to 6D). The tool sets on the turret 29a comprise tools such as a striking anvil and deboss tooling. The tool sets on the turret 29b comprise tools such as a rotary cutting device that transversely cut the sidewall of each workpiece at the appropriate height (FIG. 6E) and preferably eject the scrap after the workpiece begins moving out of the turret. The tool sets on the turrets 31a, 31b comprise tools such as re-cone tooling that reduce the diameter of the workpieces at the open, upper end in two stages to produce a neck at the open end of the main body of the can to the required diameter (FIG. 6F) to accommodate a diameter of valve ferrule that is less than the diameter of the main body of the finished can. The tool sets for re-coning may include an inner pilot die and outer coning die that descend on the workpiece to form the re-cone then retract. The tool sets on the turret 33a comprise tools such as a ram that curl over the open end of the workpieces to provide a precise sealing surface at the open end (FIG. 6G). Any sharp edge formed upon cutting is directed inwardly so that the resulting sealing surface on the workpiece is substantially that resulting from the contact with the curl tooling, and is relatively blunt. Tooling on the same turret may also dome the bottom of the workpiece inwards. The sealing surface is particularly desirable for pressurized aerosol products, particularly those where the seal is formed with an elastomeric gasket seated in the valve ferrule. The tool sets on the turret 33b comprise tools such as a mandrel and pressure wheel that bead the neck of the workpieces to provide a profile in a finished can that allows a valve to be crimped by its ferrule to the finished can (FIG. 6H).

It will be understood that the number of turrets and/or tool sets provided on the turrets may be altered according to the forming operations required to convert the cups to finished cans. FIGS. 6A to 6D show workpieces 37 resulting from the forming operations of turrets 25a, 25b, 27a and 27b respectively which are deep drawing operations. FIG. 6H shows a finished can 38. It will be understood that the shape and/or dimensions of the workpieces 37 may be altered as necessary to produce the required shape and dimensions of finished can 38.

Each pair of turrets 25a,25b; 27a,27b; 29a,29b; 31a,31b; 33a,33b is driven by a respective stepper motor 25c, 27c, 29c, 31c and 33c. The stepper motors 25c, 27c, 29c, 31c, 33c are synchronised so that the turrets rotate in unison and workpieces are transferred between the turrets by transfer wheels that also rotate in unison with the turrets. Each turret has an input transfer wheel 39 and an output transfer wheel 41 driven by its associated turret via cylindrical bosses 152 (FIG. 13) arranged circumferentially around the turret engaging with a sprocket wheel (not shown) that drives the axle of the transfer wheel and is located below the level of the forming operations.

Figure 11:
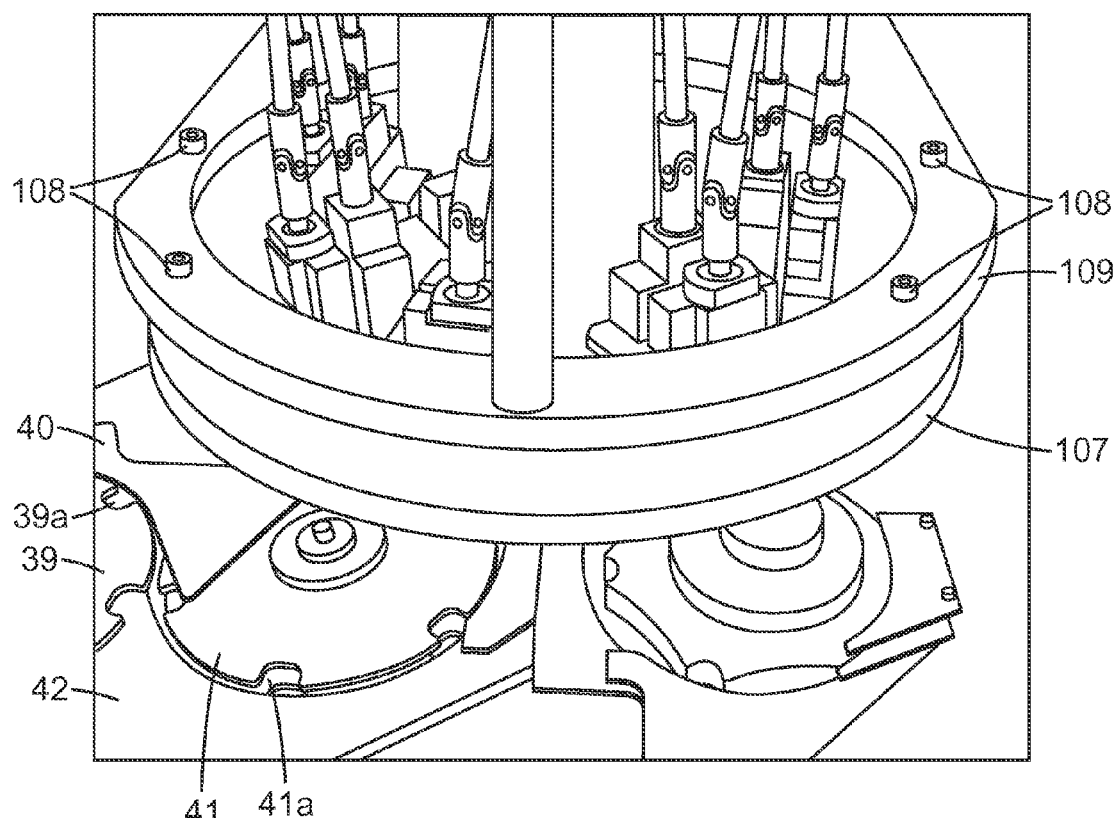
FIG. 11 is a perspective view of part of the turret shown in FIG. 8.
Figure 12:
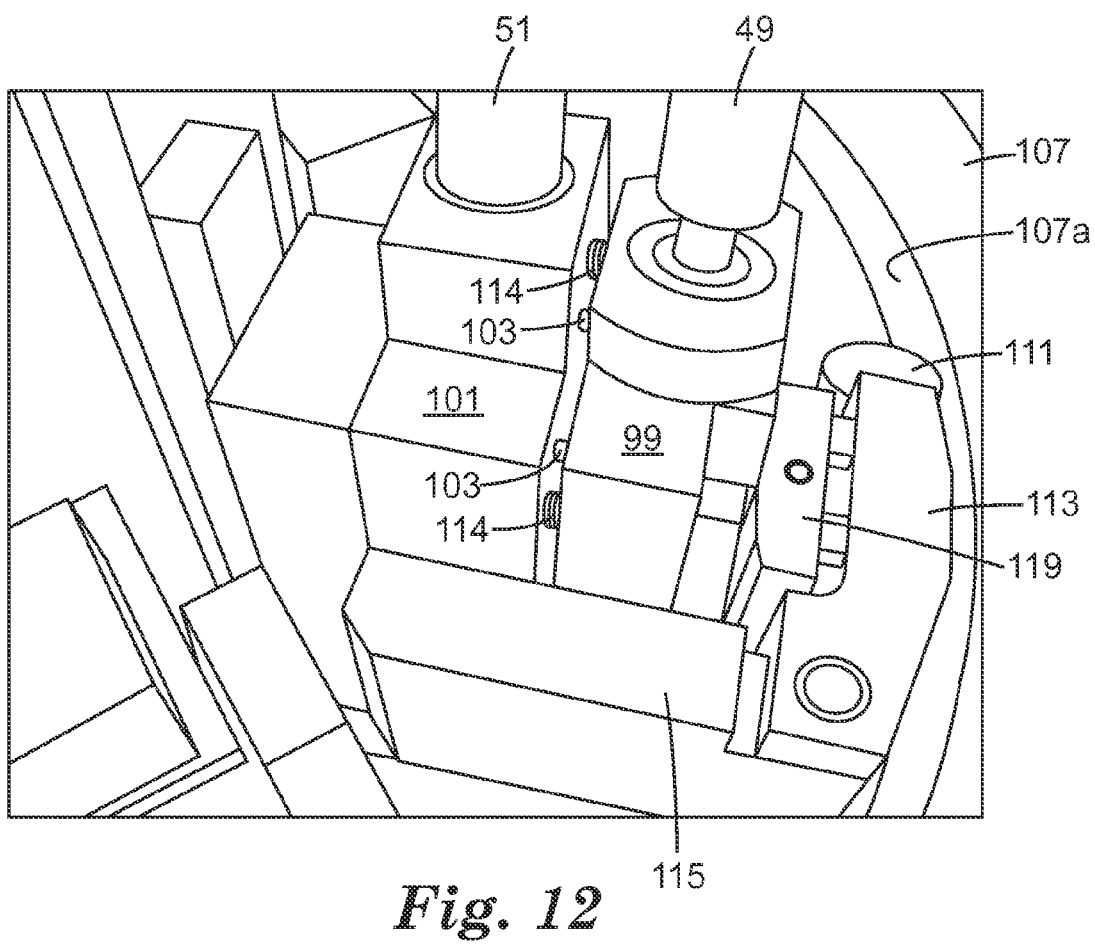
FIG. 12 shows a detail of the cam system controlling the beading set pressure wheel.

The transfer wheels 39, 41 may be made of metal for example stainless steel or plastics for example polyurethane. Plastics transfer wheels may have advantages in that they can grip the workpieces during complex transfer paths and are less susceptible to damage from misaligned parts being transferred. As best shown in FIG. 11, the transfer wheels 39, 41 are provided with a plurality of recesses or slots in the peripheral edge that are uniformly spaced apart and form seats 39a, 41a to receive a workpiece.

Guides 40, 42 retain workpieces in the seats as the wheels rotate and are configured for transferring the workpieces between the wheels 39, 41 and between the wheels 39, 41 and the turrets to load and unload workpieces into and from the turrets. Thus a guide can operate to retain a workpiece within a recess, or it can be positioned to urge the workpiece out of a recess or to guide a workpiece into a recess as the transfer wheel rotates.

These functions are coordinated where a workpiece is transferred out of a recess on a first transfer wheel and into a recess of a second transfer wheel where the two transfer wheels have an approximately common tangent. The same principle applies to transfer from a transfer wheel to a turret and vice versa. Sets of interchangeable transfer wheels 39, 41 and guides 40, 42 may be provided for different sized cans.

In this embodiment, the wheels 39, 41 comprise upper and lower plates with aligned recesses forming the seats and a table (not shown) is provided under the wheels 39, 41 to support the workpieces in the seats. The workpieces slide over the table as the wheels 39, 41 rotate to transfer the workpieces between the turrets. In a modification, the wheels 39, 41 may comprise a single plate. The recesses may provide a surface to support the workpieces in the seats. Any other means for transferring the workpieces between the turrets may be employed.

The tool sets on each turret can be nominally designated "1" to "8". The turrets may be configured on set-up to a home or start position by any suitable means such as an index mark so that a cup delivered to tool set "1" of turret 25a is transferred to tool set "1" of turret 25b and so on through turrets 27a, 27b; 29a,29b; 31a,31b and 33a,33b and the same for each of tool sets "2" to "8". In this way, the tool sets on successive turrets are matched to one another and provide eight separate lines through the rotary press 7.

A control system for the rotary press records the home or start position of each turret on initial set-up and controls the stepper motors 25c, 27c, 29c, 31c, 33c so that the turrets can be returned to the home or start position following maintenance or repair work on any of the turrets to keep the turrets synchronised. The stepper motors 25c, 27c, 29c, 31c, 33c may be provided with encoders to verify the position of each turret at any time.

The control system may incorporate optical sensors at the inlet and outlet positions of each turret to track a workpiece through the multi-stage rotary press, for example by calculating the expected time of arrival at each point where a sensor is placed and checking the coincidence of arrival.

The control system may be configured to shut down the press if a single workpiece goes missing. The control system may include a control panel with a programmable microprocessor and may include a visual display for indicating the operating status of the rotary press. Inputs to the microprocessor may be provided at the control panel or remotely by means of a hand held device.

The rotary press 7 receives cups 15 from the accumulator 5 via outlet channel 23 and the cups 15 are fed under the control of the pace wheel 43 driven by a servo motor to the input transfer wheel associated with the first turret 25a. The pace wheel 43 is synchronised to the eight lines through the rotary press 7 and can be operated via the control system to isolate any of the lines should a fault be detected with any of the tool sets of the turrets associated with that line. For example, if tolerance checks reveal finished cans 38 that are outside the allowable tolerances due to a fault in a tool set on one of the turrets, say tool set "5" of turret 29a, the pace wheel 43 can be set so as not to deliver cups 15 to the line corresponding to tool set "5 on the first turret 25a. In this way, the other seven lines of the rotary press 7 can continue to form cans and any necessary repairs to the isolated line can be carried out later when convenient. As a result, production of cans can continue until the rotary press 7 can be shut-down and repair work carried out.

Figure 7A:
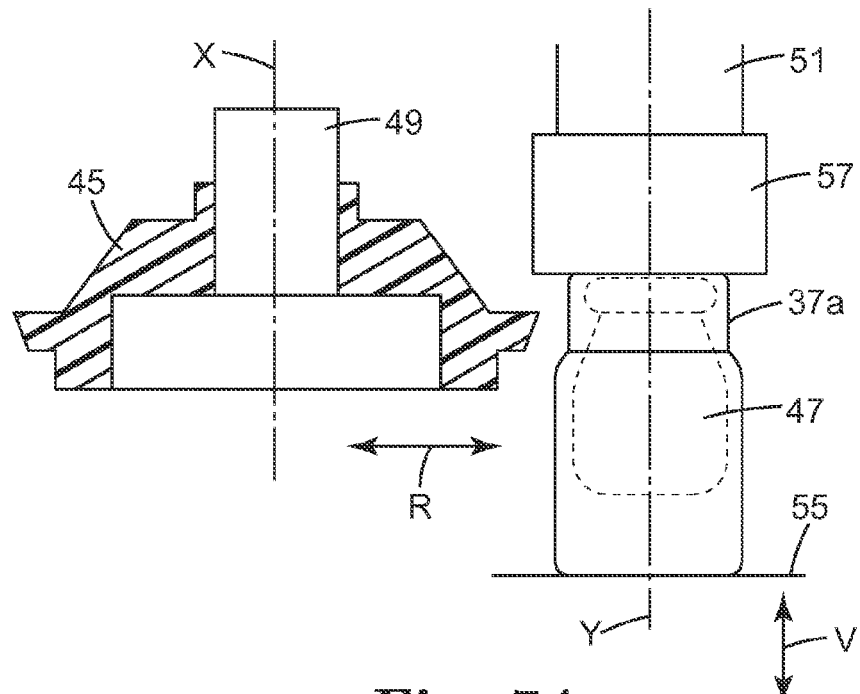
FIGS. 7A to 7C show stages in the operation of a beading tool set for beading the neck of a workpiece.
Figure 7B:
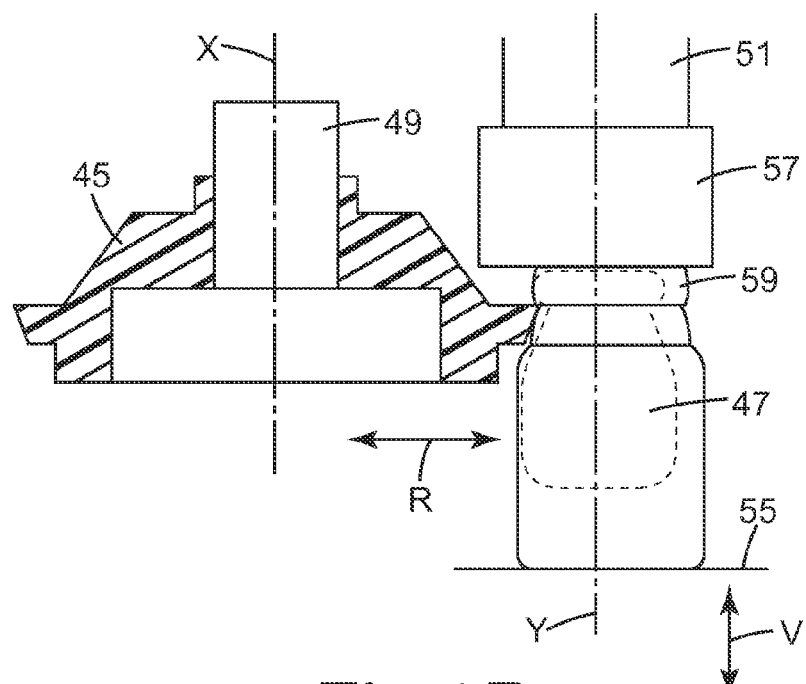
Figure 7C:
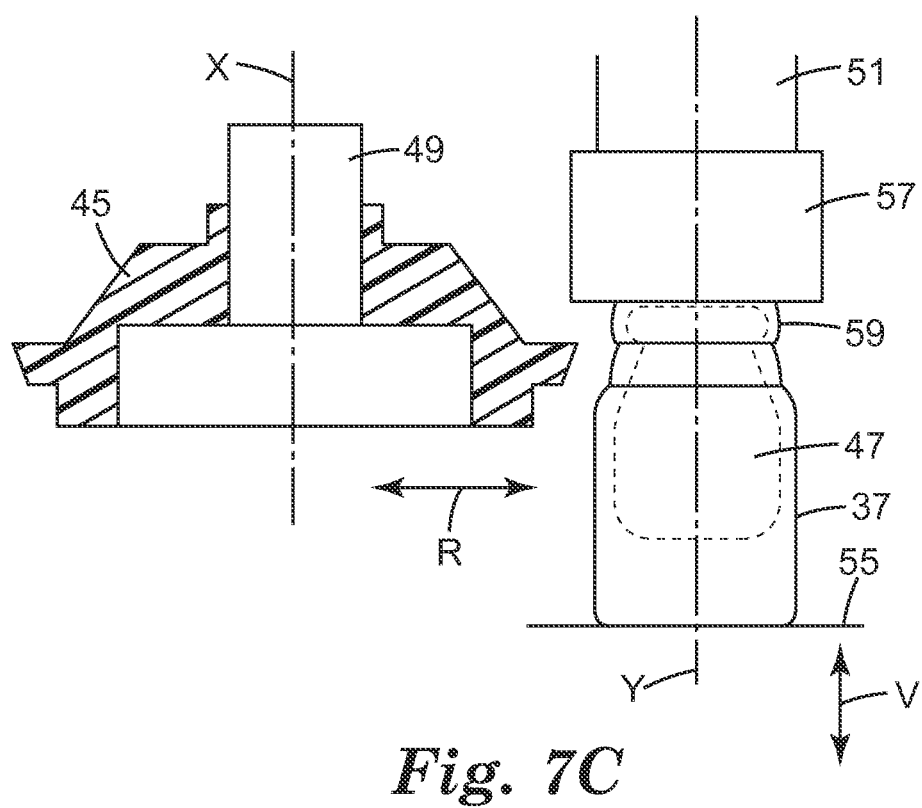

Referring now to FIGS. 7A, B, C, the beading operation at turret 33b will now be described in more detail. As explained above, the turret 33b has multiple (in this embodiment eight) identical tool sets uniformly spaced apart around the circumference of the turret 33b for performing beading operations on several cans as the turret 33b rotates.

Each beading tool set is similar and includes a pressure wheel 45 and a mandrel 47 mounted on shafts 49 and 51 respectively that are rotatable about parallel vertical axes X and Y. The rotational axis Y of the mandrel shaft 51 is fixed relative to the tool set (which itself is rotating at a fixed radial distance from the central axis of the turret). The rotational axis X of the pressure wheel shaft 49 is radially movable relative to the turret to move the pressure wheel 45 towards and away from the mandrel 47 as indicated by the arrow R.

Workpieces 37 from turret 33*a* are fed one at a time to the inlet position of turret 33*b* by means of the transfer wheels 39, 41 (FIG. 11) to coincide with return of a beading tool set to the inlet position as the turret 33*b* rotates. Each beading tool set is provided with a lifting module including a platform generally indicated at 55 that is located under the mandrel 47 of the associated beading tool set. The platform 55 is raised and lowered relative to the mandrel 47 as indicated by the arrow V as the turret 33*b* rotates by a cam system described in more detail later. The platform 55 is lowered at the inlet position to allow loading of the workpiece 37 below the mandrel 47. The lifting module includes means described in more detail later to position the workpiece 37 accurately below the mandrel 47.

As the turret 33*b* rotates from the inlet position, the platform 55 is raised to position the workpiece 37 over the mandrel 47 FIG. 7A). The workpiece 37 is located in the required position by engagement with the underside of a collar 57 on the shaft 51. The pressure wheel 45 is then moved radially towards the workpiece 37 by means of a cam system as described in more detail later. The pressure wheel 45 is shaped on its circumference to mirror the required cross-sectional profile of the bead and squeezes part of the coned and curled neck region 37*a* of the workpiece 37 against a complementary shape on the circumference of the mandrel 47 while the pressure wheel 45 and the mandrel 47 carrying the workpiece 37 are rotated.

During this process the workpiece rotates about an axis parallel to and offset from the axis of the mandrel due to the outer diameter of mandrel being less than the inner diameter of the workpiece. The rotational speeds of the pressure wheel 45 and mandrel 47 are controlled such that the rotational speeds of the surfaces of the pressure wheel 45 and mandrel 47 that bear against the neck 37*a* of the workpiece 37 are the same or substantially the same to avoid or minimise any frictional slippage so that the entire circumference of the workpiece 37 is beaded by the minimum of rotation.

Furthermore, the profiles of the pressure wheel 45 and mandrel 47 are such that the workpiece 37 is squeezed locally between the pressure wheel 45 and mandrel 47 and is prevented from tilting about the rotational axis of the mandrel 47 by spring-loading of the platform 55 and by the flat underside of the collar 57 so that the wall of the workpiece is necked in a few millimeters below the open end of the workpiece with a profile matching the tooling.

Thus following on from curling, in the finished can 38, a bead 59 is formed uniformly about the circumference of the neck 37*a*. While the bead 59 is formed, the platform 55 remains in the raised position. Once the bead 59 has been formed, the pressure wheel 45 is moved radially away from the finished can 38 and the platform 55 is lowered together with the finished can 38. In the lowered position of the platform 55, the finished can 38 is clear of the lower end of the mandrel 47 and can be ejected from the turret 33*b* at the outlet position before the tool set returns to the inlet position to receive another part finished can 37 from turret 33*a*.

Removal of the finished can from the mandrel 47 may be assisted by injecting compressed air or other fluid into the can through the mandrel 47.

Referring now to FIGS. 8 to 17, the construction and operation of the beading turret 33*b* is now described in more detail.

The turret 33*b* has a central shaft 61 mounted in the frame 35 for rotation about a fixed vertical axis. The central shaft 61 is driven by the stepper motor 33*c* to rotate the turret 33*b*. A drive ring 63 surrounds the central shaft 61 and is mounted coaxially with the central shaft 61 on bearings for rotational movement independently of the turret 33*b* to drive the pressure wheel 45 and mandrel 47 of each beading tool set.

Figure 9:
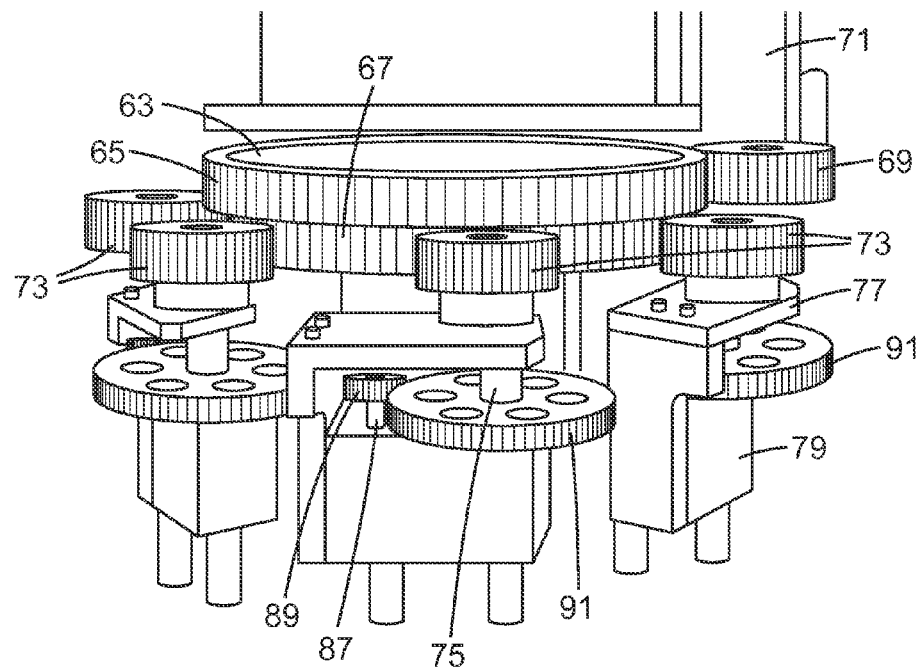
FIG. 9 is perspective view of part of the turret shown in FIG. 8.
Figure 10:
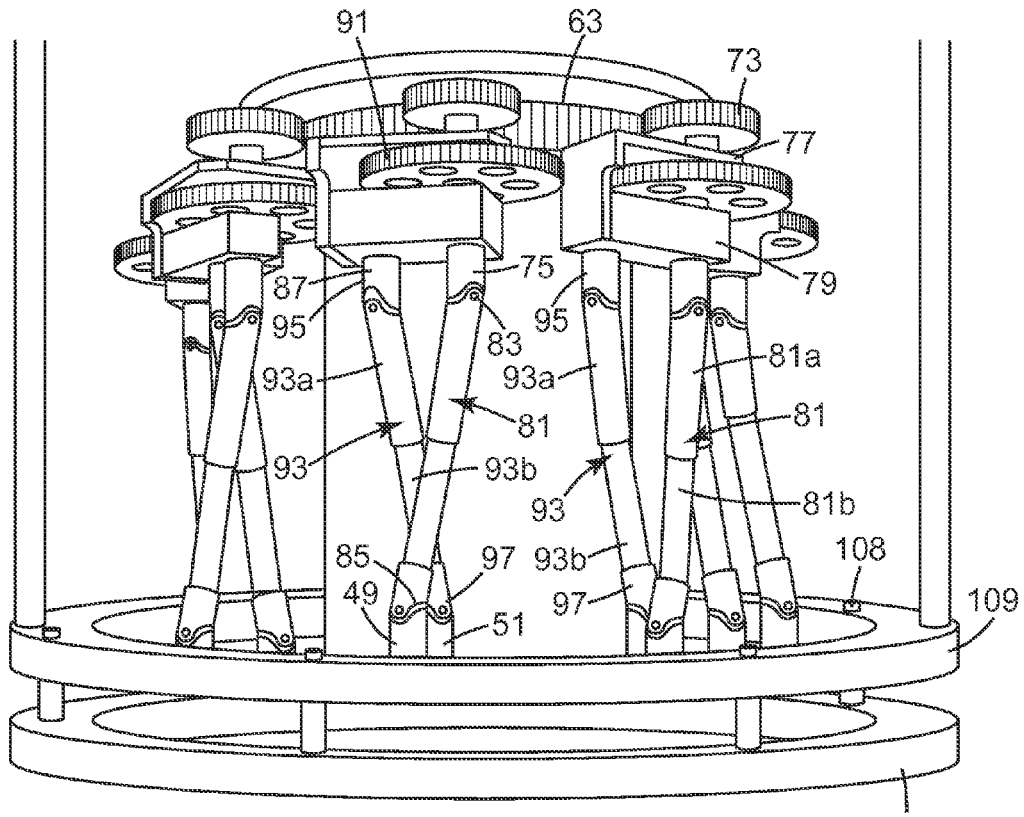
FIG. 10 is a perspective view of part of the turret shown in FIG. 8.

The drive ring 63 has outwardly directed upper and lower tandem cog races 65 and 67 (FIG. 9). The upper cog race 65 meshes with a gear cog 69 driven by a motor 71 for rotating the drive ring 63 and is independently controllable relative to the central shaft 61. The control system for the stepper motors may also control the motor 71. The lower cog race 67 meshes with eight gear cogs 73 uniformly spaced apart around the turret 33*b*. The gear cogs 73 provide power take-offs from the drive ring 63 to the eight beading tool sets to rotate the pressure wheel 45 and mandrel 47 of each beading tool set during the beading operation.

Each gear cog 73 is coaxially mounted on the upper end of a shaft 75 mounted on rotational bearings through a plate 77 and a block 79 that are bolted together and fixed relative to the central shaft 61 to rotate with the turret 33*b*. The lower end of the shaft 75 is connected to the upper end of a telescopic shaft 81 by a universal coupling 83. The shaft 81 comprises two telescoped sections 81*a*, 81*b* having co-operating internal and external cross-sections that allow relative axial movement to change the length of the shaft 81 while continuing to provide a rotational drive. For example, the telescoped sections 81*a*, 81*b* may have co-operating non-circular cross-sections such as hexagonal. Alternatively, the co-operating cross-sections may comprise mating axial splines. Any arrangement of the telescoped sections that transmits rotational movement while permitting relative axial movement may be employed. The lower end of the shaft 81 is connected to the upper end of the pressure wheel shaft 49 by a universal coupling 85. In this way, rotational drive from the drive ring 63 is transmitted to the pressure wheel shaft 49 to rotate the pressure wheel 45.

A shaft 87 mounted on rotational bearings through the block 79 is provided with a gear cog 89 coaxially mounted on the upper end of the shaft 87 that meshes with a gear wheel 91 mounted on the shaft 75 between the plate 77 and block 79. The lower end of the shaft 87 is connected to the upper end of a telescopic shaft 93 by a universal coupling 95. The shaft 93 comprises two telescoped sections 93*a*, 93*b* having co-operating internal and external cross-sections that allow relative axial movement to change the length of the shaft 93 while continuing to provide a rotational drive. For example, the telescoped sections 93*a*, 93*b* may have co-operating non-circular cross-sections such as hexagonal. Alternatively, the co-operating cross-sections may comprise mating axial splines. Any arrangement of the telescoped sections that transmits rotational movement while permitting relative axial movement may be employed. The lower end 93*b* of the shaft 93 is connected to the upper end of the mandrel shaft 51 by a universal coupling 97. In this way, rotational drive from the drive ring 63 is transmitted to the mandrel shaft 51 to rotate the mandrel 47.

The pressure wheel shaft 49 is mounted on rotational bearings through a block 99 and the mandrel shaft 51 is mounted on rotational bearings through a block 101 (FIGS.

12, 16 and 17). The block 101 is fixed relative to the central shaft 61 to rotate with the turret 33b and has two spaced, parallel pins 103 transverse to the rotational axis of the mandrel 47 that are received in aligned bores 105 in the block 99. The block 99 can slide back and forth relative to the block 101 along the pins 103 to move the pressure wheel 45 towards and away from the mandrel 47.

The cam system that controls movement of the pressure wheel 45 in response to rotation of the turret 33b includes a cam ring 107 that surrounds the central shaft 61 and is suspended with bolts 108 below a support ring 109 that is attached to the frame 35. The cam ring 107 has a profiled inner surface 107a forming a circular path of varying radius relative to the axis of the central shaft 61. The cam system also includes a cam follower comprising a wheel 111 mounted for rotation at one end of a cam plate 113. The other end of the cam plate 113 is pivotally connected to a link plate 115. The link plate 115 has two pins 116 for locating the link plate 115 relative to the block 101 and is fixed to block 101.

The wheel 111 engages the inner surface 107a of the cam ring 107 and follows the circular path as the turret 33b rotates. The block 99 is located between the block 101 and the cam plate 113 and return springs 114 received in aligned bores 118 in the blocks 99, 101 bias the block 99 away from the fixed block 101 towards the cam plate 113 to engage a roller 117 mounted in a carriage 119 secured to the cam plate 113. Movement of the block 99 towards and away from the block 101 is controlled by pivotal movement of the cam plate 113 in response to engagement of the follower wheel 111 with the inner surface 107a of the cam ring 107 as the turret 33b rotates.

During the beading operation, the cam plate 113 is pivoted inwardly so that the block 99 is pushed towards the fixed block 101 compressing the return springs 114 and bringing the pressure wheel 45 against the neck of a workpiece located over the mandrel 47 to form the bead. The position of the pressure wheel 45 during the beading operation can be adjusted on set-up by shims 120 located between the carriage 119 and the cam plate 113, or by a screw positioned to abut one of the plates.

Once the bead is formed, the inner surface 107a of the cam ring 107 allows the return springs 114 to push the block 99 away from the fixed block 101 and pivot the cam plate 113 outwardly so that the pressure wheel 45 moves away from the mandrel 47. The finished can is no longer held between the pressure wheel 45 and mandrel 47 and can be lowered with platform 55 to clear the mandrel so that the finished can to be ejected from the turret 33b at the outlet position and another workpiece to be inserted into the turret 33b at the inlet position.

Figure 8:
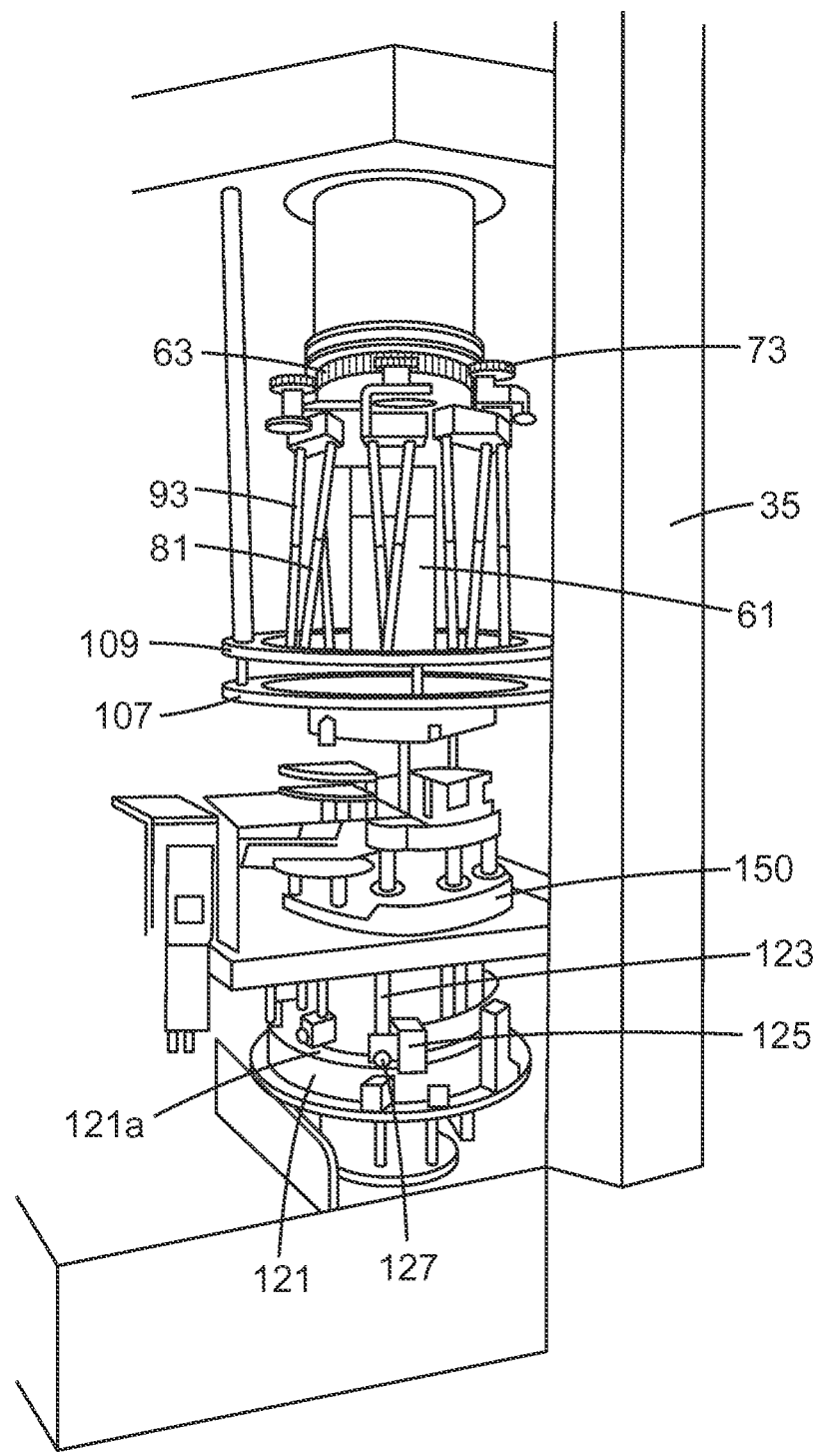
FIG. 8 is a perspective view of a turret employing a plurality of beading tool sets with some parts omitted for clarity.

The cam system that controls movement of the lifting module to raise and lower the platform 55 relative to the mandrel 47 in response to rotation of the turret 33b is shown in FIG. 8 and includes a cam ring 121 that surrounds the central shaft 61 at the bottom of the turret 33b and is fixed relative to the turret frame 35. The cam ring 121 has an upper surface 121a forming an undulating circular path of varying height about the bottom of the turret 33b.

The platform 55 is mounted at the upper end of a shaft 123 guided for sliding movement in a vertical direction by a sliding bearing in plate 150 which permits little lateral movement. The lower end of the shaft 123 is connected to a block 125 that supports a cam follower in the form of a roller 127 mounted for rotation about a generally horizontal axis transverse to the shaft 123. The roller 127 engages the upper surface 121a of the cam ring 121 and follows the undulating circular path as the turret 33b rotates thereby raising and lowering platform 55 according to the height of the upper surface 121a.

The platform 55 is lowered at the inlet position for loading a workpiece from the turret 33b and is raised as the turret rotates to position the workpiece over the mandrel 47 during the beading operation. At the end of the beading operation, the workpiece is lowered with the platform 55 to be ejected from the turret 33b at the outlet position before the platform 55 returns to the inlet position to pick up another workpiece from turret 33a.

Figure 13:
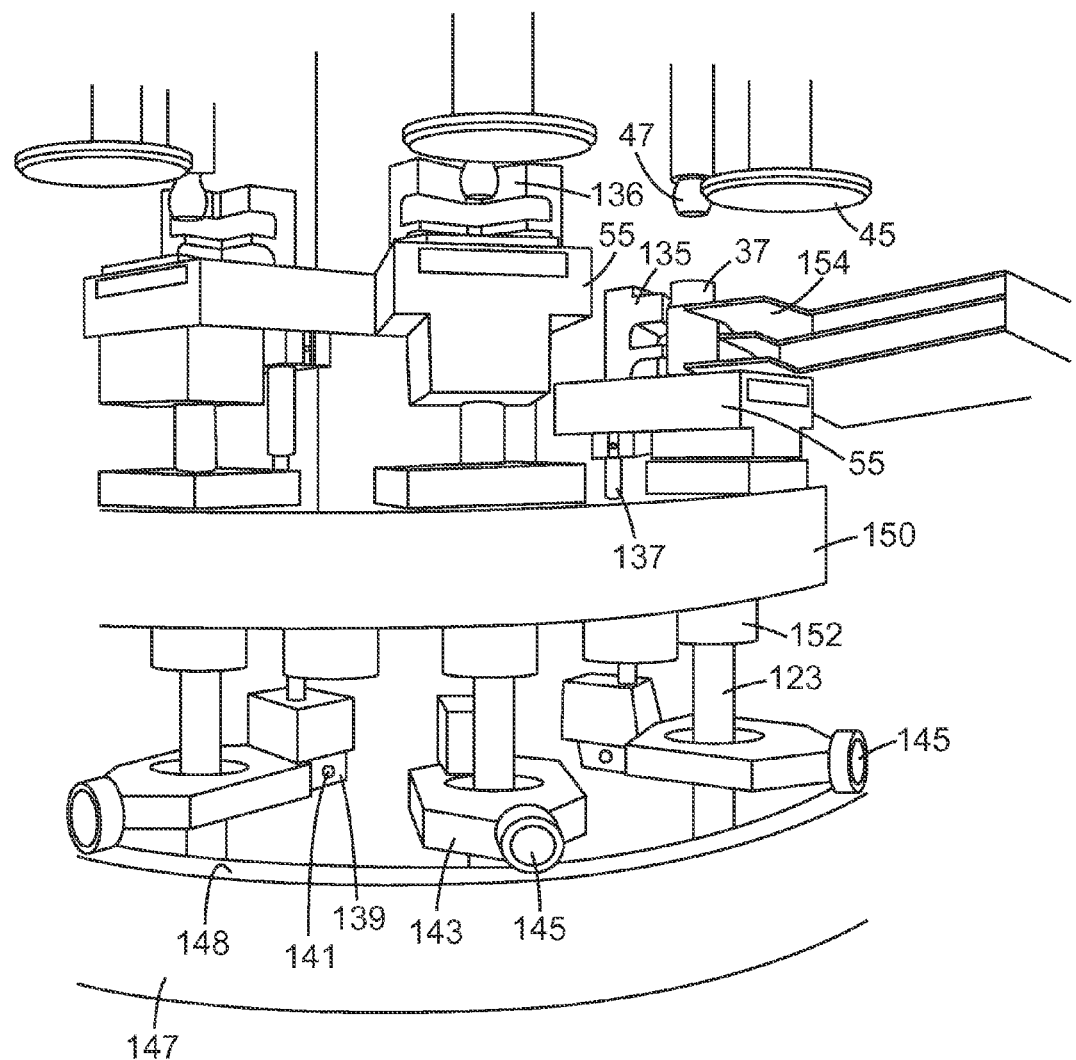
FIG. 13 is a perspective view of part of the turret shown in FIG. 8.
Figure 14:
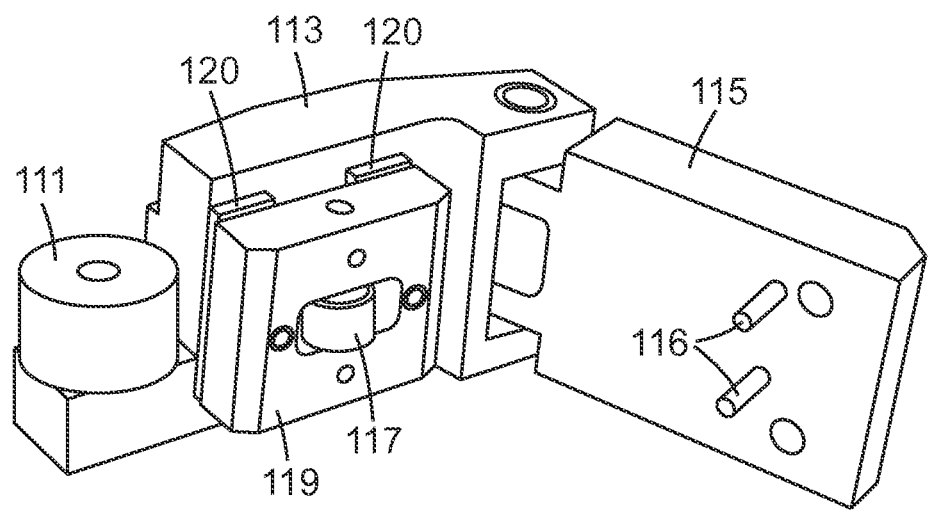
FIG. 14 shows part of the cam system shown in FIG. 12.
Figure 15:
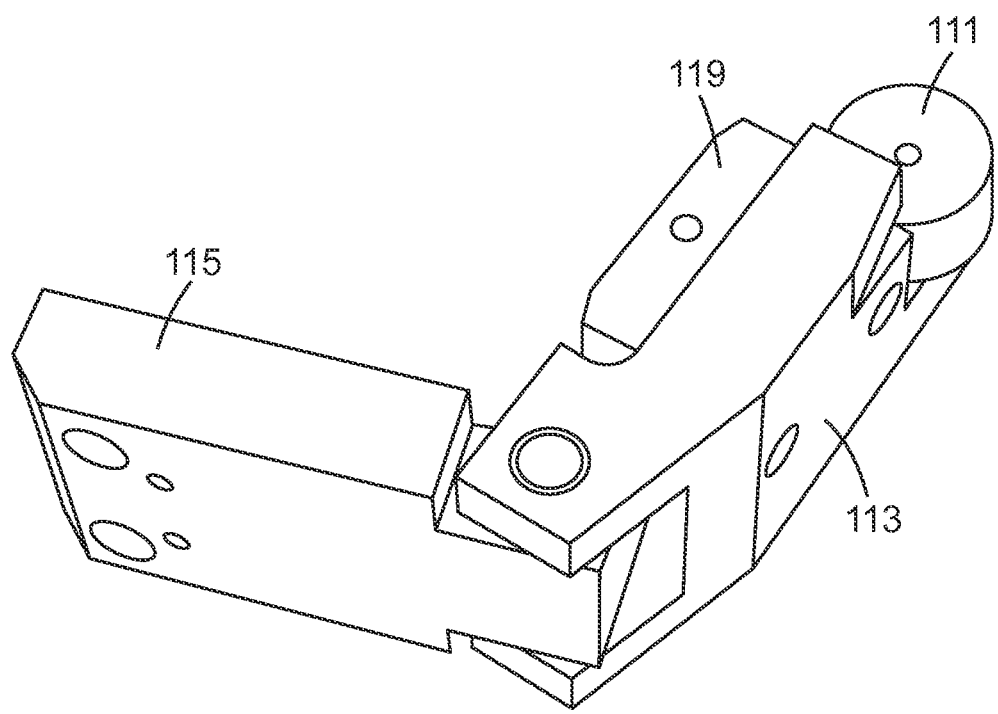
FIG. 15 shows part of the cam system shown in FIG. 12.
Figure 16:
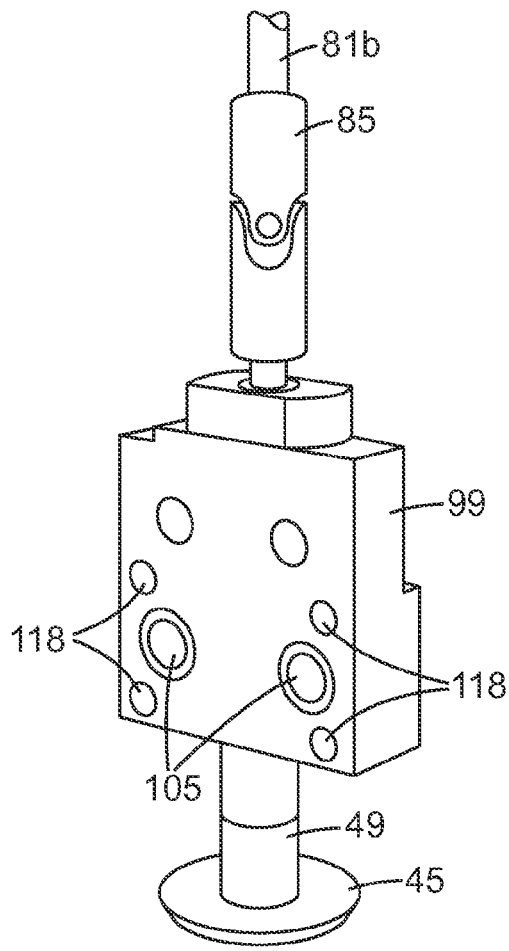
FIG. 16 shows the beading tool set pressure wheel.
Figure 17:
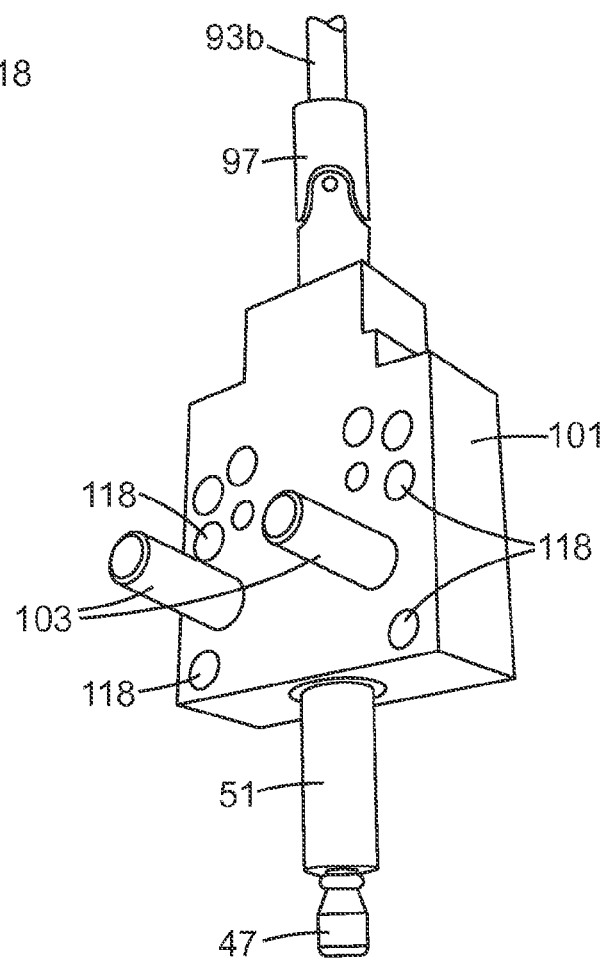
FIG. 17 shows the beading tool set mandrel.

The alignment means to position the workpiece under the mandrel 47 is shown in FIG. 13 and includes a movable backstop 135 that is provided towards the rear of the platform 55 and has a 'V' shaped vertical groove 136 in the front face for receiving a workpiece 37.

The backstop 135 is located at a forward position when the platform 55 is lowered at the inlet position and a guide rail 154 associated with the inlet transfer wheel (not shown) of the turret 33b is configured to urge a workpiece 37 from the input transfer wheel into the turret 33b to position the workpiece 37 in the groove 136 as shown for the lifting module at the right hand side of FIG. 13.

In this position, workpiece 37 is positioned below mandrel 47 on a spring loaded disc (not shown) that is rotatably mounted in the platform 55 so as to rotate with the workpiece 37 during the beading operation thereby minimising any resistance to rotation of the workpiece relative to the platform 55. In a modification (not shown) the platform may have a surface of low friction material that may facilitate rotation of the workpiece relative to the platform 55 during the beading operation.

As the turret 33b rotates the platform 55 is raised and the backstop 135 is moved away from the workpiece 37 towards the central axis of the turret to a rearward position by a cam system including a cam ring 147 that extends around the central shaft 61 and is fixed relative to the turret frame 35. The cam ring 147 has an upper surface 148 forming an undulating circular path of varying height about the turret 33b.

The backstop 135 is mounted at the upper end of a shaft 137 that extends with clearance though an opening (not shown) in the platform 55. The lower end of the shaft 137 is connected to an arm 143 that is pivotally mounted at one end and supports a cam follower in the form of a roller 145 at the other end. The roller 145 is mounted for rotation about a generally horizontal axis transverse to the shaft 137 and engages the upper surface 148 of the cam ring 147.

The roller 145 follows the undulating circular path as the turret 33b rotates thereby causing the arm 143 to pivot about pivot axis 141 which in turn causes shaft 137 to pivot and move the backstop 135 towards the central axis of the turret.

The undulating path is coordinated with the undulating path for the platform 55 in the following way. As soon as the workpiece enters the turret, the platform 55 raises the workpiece 37. Once the workpiece 37 has surrounded the mandrel 47, the backstop 135 is rocked backwards allowing the workpiece to rotate about an axis closer to the turret during the beading operation in which the workpiece is nipped between the mandrel 47 and the pressure wheel 45.

Once beading is completed, the platform is lowered and, when the mandrel 47 is clear of the workpiece 37, the backstop 135 returns to the forward position and locates the workpiece in the path of a guide rail (not shown) at the outlet position that moves the workpiece from the platform 55 to the outlet transfer wheel (not shown) leaving the platform 55 ready to receive the next workpiece at the inlet position.

Figure 18:
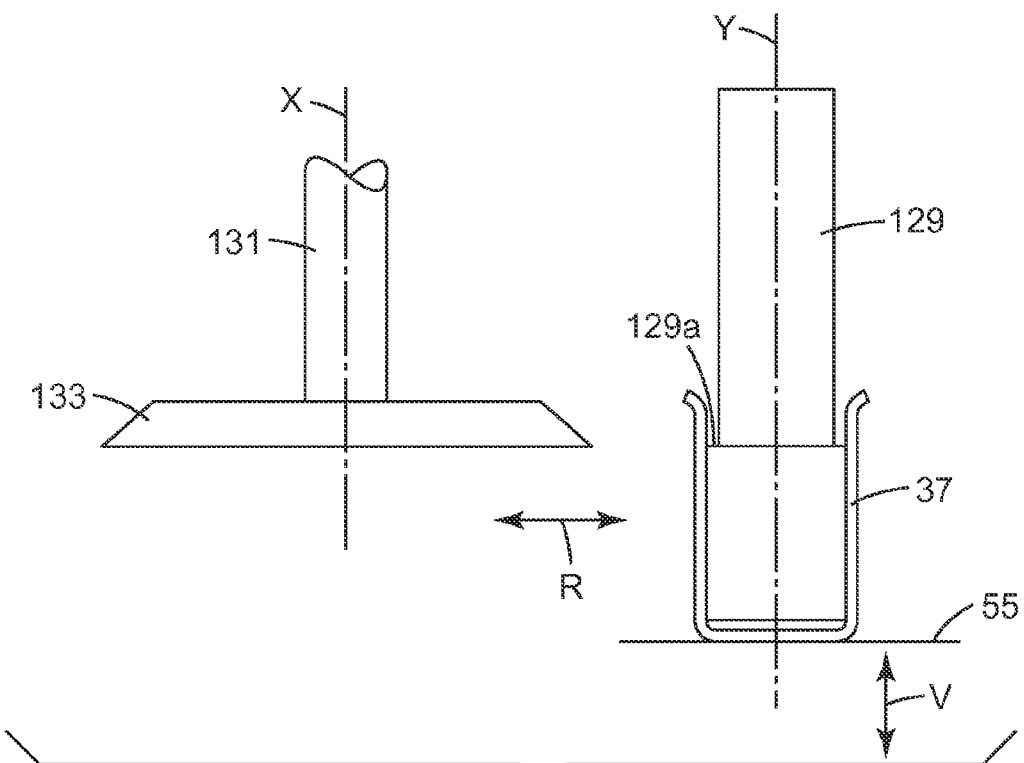
FIG. 18 shows an arrangement of a cutter wheel and spindle for trimming the wall of a workpiece.
Figure 19:
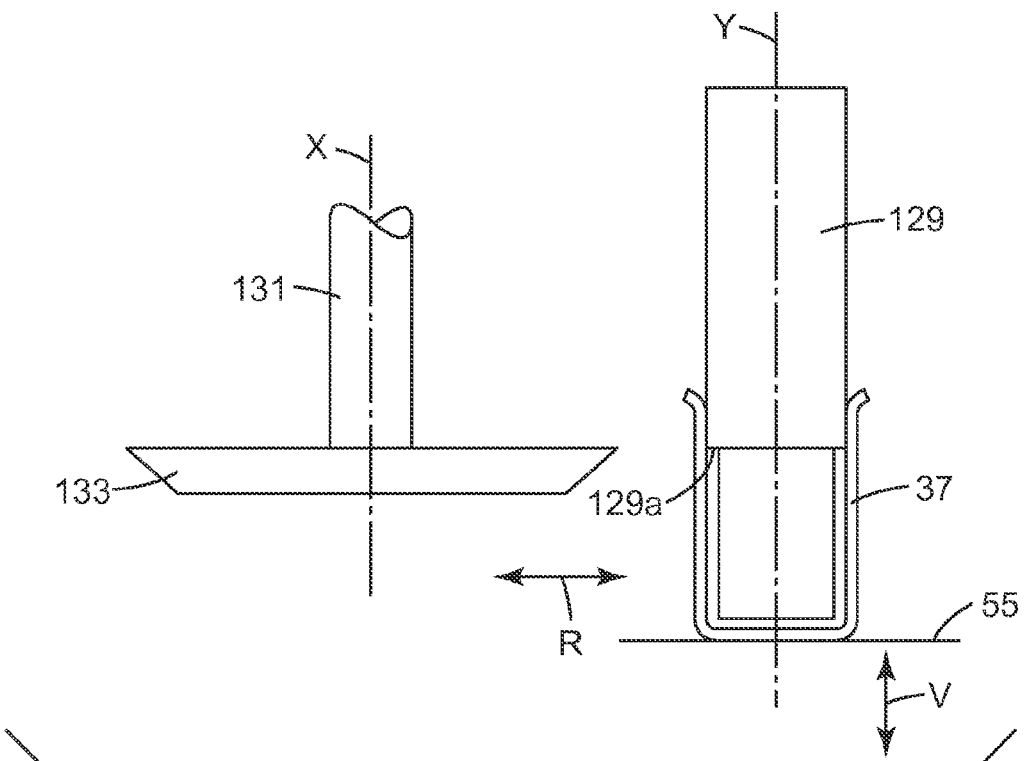
FIG. 19 shows an alternative trimming arrangement.
Figure 20:
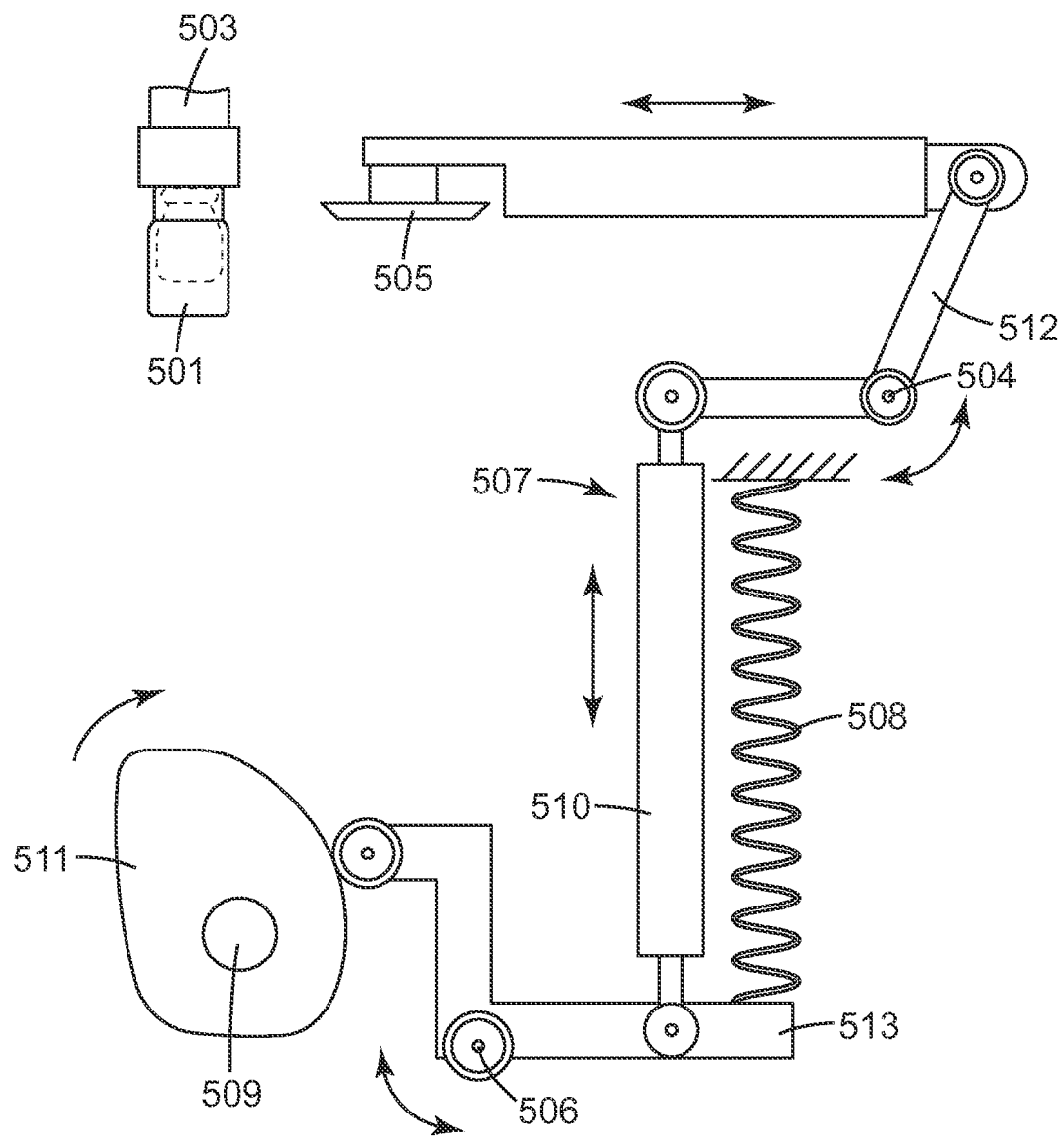
FIG. 20 shows a cam system for controlling a beading tool set of an in-line transfer press according to the prior art.

Referring now to FIGS. 18 and 19, two arrangements of the cutting tool sets for trimming workpieces to the required length at turret 29*b* are shown. In both arrangements, a spindle 129 and a shaft 131 are rotatable about parallel axes Y and X by a drive arrangement similar to that described above for rotating the pressure wheel shaft and mandrel shaft of the beading tool sets on turret 33*b*.

Shaft 131 carries a cutter wheel 133 at the lower end and is radially movable towards and away from the spindle 129 as indicated by the arrow R by means of a cam system similar to that described above for controlling radial movement of the pressure wheel of the beading tool sets on the turret 33*b*.

A workpiece 37 from turret 29*a* is loaded into a lifting module including a platform 55 positioned under the spindle 129 at an inlet position of turret 29*b* with the platform 55 in a lowered position. The platform 55 is raised and lowered relative to the spindle 129 as indicated by arrow V as the turret rotates by means of a cam system similar to that described above for the lifting modules of the beading tool sets on turret 33*b*.

The platform 55 has a fixed back stop with a V-shaped groove (not shown) for positioning a workpiece loaded into the turret precisely in relation to the spindle 129. The workpiece 37 may be located on a rotatable disc in the platform as described for the beading operation. As the turret 29*b* rotates, the platform 55 is raised to position the workpiece over the spindle 129. The shaft 131 is then moved towards the spindle 129 to cut the workpiece with the cutter wheel 133 around the circumference at a pre-determined position to produce a required length of sidewall.

As shown, the spindle 129 has a step 129*a* where the workpiece is cut to provide clearance so that the cutter wheel 133 does not come into contact with the spindle 129 when cutting through the sidewall of the workpiece and since the wider diameter part of the spindle is substantially the same as the internal diameter of the workpiece, the spindle 129 internally supports the workpiece and prevents the workpiece tilting about the rotational axis of the spindle 129 during the cutting operation. The base of the workpiece may also be supported against the bottom of the spindle, e.g. by a spring-loaded disc such as described earlier re the beading operation.

As the radial position of the workpiece does not change during the trimming operation, the back stop is fixed and may be made of low friction material. This is not essential and the backstop could move similar to the back stop employed for the beading operation.

The rotation of the cutter wheel 133 and spindle 129 is also controlled such that the rotational speeds of the surfaces of the cutter wheel 133 and spindle 129 that bear against the sidewall of the workpiece 37 are the same or substantially same to avoid or minimise any frictional slippage so that the entire circumference of the workpiece 37 is cut by the minimum of rotation.

After the sidewall has been cut, the shaft 131 is moved away from the spindle and the platform is lowered with the trimmed workpiece. In the lowered position of the platform 55, the trimmed workpiece is clear of the lower end of the spindle 129 and can be ejected from the turret 29*b* at the outlet position by an ejector as described for the lifting modules on turret 33*b* before the tool set returns to the inlet position to receive another workpiece 37 from turret 29*a*.

Removal of the workpiece from the spindle 129 may be assisted by injecting compressed air or other fluid into the workpiece through the spindle 129. Additionally, the trimming operation preferably involves cam operated fingers (not shown) for removing the trimmed workpiece and offcut from the spindle 129. The fingers are preferably assisted initially by a compressed air supply that directs air downwardly at the offcut.

The above-described arrangement for raising and lowering workpieces using a cam operated lifting module to position the workpiece relative to a tool set for carrying out a forming operation on the workpiece may be employed where appropriate in any of the other turrets of the multistage rotary press described herein.

Thus the lifting module may receive a workpiece in a lowered position and raise the workpiece relative to an associated tool set for carrying out a forming operation on the workpiece in a raised position and then lower the workpiece to a lowered position clear of the tool set for ejection from the turret.

Depending on the forming operation, the platform may have a movable backstop to locate the workpiece relative to the tool set as described for the beading operation or a fixed backstop as described for the trimming operation.

We have found that employing a rotary press with multiple turrets each provided with multiple tool sets, the rate of production of aerosol cans may be increased significantly compared to in-line transfer presses. Thus is may be possible to increase production from around 150 cans per minute to 600 cans per minute employing the method and apparatus described herein.

In addition, by offsetting the tool sets on each turret so that each tool set on a turret is at a different stage in the forming operation as the turret rotates, operating noise levels may be reduced and temperature changes during operation affecting settings leading to changes in the dimensions of the cans may be reduced or eliminated.

EMBODIMENTS

Embodiment 1 is an apparatus for forming an aerosol can for a metered dose inhaler, the apparatus including a turret rotatable about a central axis and having a plurality of tool sets for carrying out a forming operation on a respective plurality of workpieces as the turret rotates, wherein each tool set is configured and arranged to move about said central axis as the turret rotates and wherein each tool set comprises two rotatably driven tools that are configured and arranged to carry out a beading operation or a trimming operation on a workpiece.

Embodiment 2 is an apparatus according to embodiment 1 wherein the turret is a beading turret wherein said two rotatably driven tools of each tool set include a pressure wheel tool and a mandrel tool for performing a beading operation on a workpiece by rotatively nipping the workpiece between complementary profiles of the tools.

Embodiment 3 is an apparatus according to embodiment 1 wherein the turret is a trimming turret wherein said two rotatably driven tools of each tool set include a cutting wheel tool and a spindle tool for performing a trimming operation on a workpiece by rotatively cutting the workpiece between the tools.

Embodiment 4 is an apparatus according to any preceding embodiments wherein the rotatably driven tools of each tool set are mounted for rotation about axes parallel to each other and to the central axis and the tools are relatively movable in a direction transverse to the central axis only for performing a beading operation or a trimming operation on a workpiece according to whether the turret is beading turret or a trimming turret.

Embodiment 5 is an apparatus according to any preceding embodiments wherein each tool set is co-operable with a stationary cam that extends about the turret for controlling relative movement of the tools for performing a beading operation or trimming operation on a workpiece.

Embodiment 6 is an apparatus according to embodiment 5 wherein said two rotatably driven tools of each tool set are biased away from each other and the tool set includes a cam follower co-operable with the stationary cam for relatively moving said two rotatably driven tools towards each other for carrying out a beading operation or a trimming operation.

Embodiment 7 is an apparatus according to embodiment 6 wherein the cam follower is pivotally mounted and is adjustable to vary the relative movement of said two rotatably driven tools towards each other.

Embodiment 8 is an apparatus according to any of embodiments 5 to 7 wherein the tool sets are positioned in the vicinity of, preferably adjacent to, the stationary cam such that the stationary cam and tools of each tool set are arranged in a generally horizontal plane and the cam is configured to control relative movement between the tools of each tool set radially with respect to the central axis of the turret.

Embodiment 9 is an apparatus according to embodiment 8 wherein the tools of each tool set are both movable towards and away from each other for performing a beading operation or a trimming operation.

Embodiment 10 is an apparatus according to embodiment 8 wherein the position of one of the tools of each tool set is fixed relative to the central axis of the turret and the position of other tool is movable relative to the central axis of the turret towards and away from the fixed tool for performing a beading operation or a trimming operation.

Embodiment 11 is an apparatus according to embodiment 10 wherein the fixed tool is the radially inner tool with the cam positioned outboard of the radially outer tool for moving the outer tool relative to the inner tool.

Embodiment 12 is an apparatus according to embodiment 11 wherein the fixed tool is the radially outer tool with the cam positioned inboard of the radially inner tool for moving the inner tool relative to the outer tool.

Embodiment 13 is an apparatus according to embodiment 10 or embodiment 11 wherein a cam follower for the movable tool co-operates with a radially directed cam surface of the cam such that the cam force is directly applied in the direction of movement of the movable tool.

Embodiment 14 is an apparatus according to any preceding embodiments wherein the turret has drive means for rotating the tools of each tool set.

Embodiment 15 is an apparatus according to embodiment 14 wherein the drive means comprises a drive ring that surrounds the turret and each tool set has a respective drive shaft for each tool that is driven by the drive ring.

Embodiment 16 is an apparatus according to embodiment 15 wherein the drive shafts for the tools of each tools set are configured to accommodate relative movement of the tools while maintaining the rotational axes of the tools parallel to each other and to the central axis of the turret.

Embodiment 17 is an apparatus according to embodiment 15 or embodiment 16 wherein one or both drive shafts of a tool set includes one or more flexible couplings to accommodate angular and/or axial movement of the drive shafts.

Embodiment 18 is an apparatus according to any of embodiments 15 to 17 wherein the tools of each tool set are mounted at a lower end of the drive shafts that are rotatably received in respective tool blocks defining the rotational axes of the tools.

Embodiment 19 is an apparatus according to embodiment 18 wherein one of the tool blocks is fixed and the other tool block is movable relative to the fixed tool block for moving the tools towards and away from each other.

Embodiment 20 is an apparatus according to embodiment 19 wherein the tool blocks are guided towards and away from each other by engagement of co-operating formations on the blocks.

Embodiment 21 is an apparatus according to embodiment 20 wherein one tool block has one or more guide pins received in openings in the other guide black such that the movable tool block can slide back and forth relative to the fixed tool block by engagement of the pins in the slots.

Embodiment 22 is an apparatus according to embodiment 21 wherein the tool blocks are biased to separate the tools by one or more springs acting between the tool blocks so that the cam follower for the movable tool is urged to engage the cam.

Embodiment 23 is an apparatus according to embodiment 22 wherein the cam follower for the movable tool is adjustable to vary the distance the movable tool is moved towards the fixed tool against the biasing of the spring(s) between the tool blocks.

Embodiment 24 is an apparatus according to any preceding embodiment wherein one of the tools of each tool set is positioned within the workpiece (the internal tool) and the relative movement between the tools brings the other tool into contact with an outer surface of the workpiece (the external tool) to trap locally the wall of the workpiece between the tools for carrying out a beading operation or a trimming operation on the wall of the workpiece.

Embodiment 25 is an apparatus according to embodiment 24 wherein the position of the internal tool is fixed relative to the central axis and the position of the external tool is movable relative to the central axis.

Embodiment 26 is an apparatus according to embodiment 24 or embodiment 25 wherein the internal tool is configured to provide support for the wall of the workpiece at least in the region where the wall is trapped between the tools.

Embodiment 27 is an apparatus according to any of embodiments 24 to 26 wherein the external tool is arranged to contact the outer surface of the workpiece at the peripheral edge of the wheel.

Embodiment 28 is an apparatus according to any of embodiments 2 to 27 wherein the peripheral edge of the wheel is shaped to carry out a beading operation or a trimming operation.

Embodiment 29 is an apparatus according to any preceding embodiment wherein co-operating profiles of the tools run at the same velocity to reduce or eliminate slippage against the workpiece.

Embodiment 30 is an apparatus according to any preceding embodiment wherein each tool set has an associated lifting module arranged to receive a workpiece loaded into the turret and to raise the workpiece to position one tool of the tool set within the workpiece for a beading operation or a trimming operation, and, after the beading operation or trimming operation, the lifting module is arranged to lower the workpiece to clear said one tool so that the workpiece can be unloaded from the turret.

Embodiment 31 is an apparatus according to embodiment 30 wherein the lifting module is co-operable with a stationary cam that extends about the turret for controlling movement of the lifting module to raise and lower the workpiece.

Embodiment 32 is an apparatus according to embodiment 31 wherein the lifting module includes a platform mounted at the upper end of a shaft that extends parallel to the central axis of the turret and has a cam follower at the lower end that engages the cam as the turret rotates about the central axis relative to the cam.

Embodiment 33 is an apparatus according to any of embodiments 30 to 32 wherein the lifting module of each tool set has means for receiving and aligning a workpiece loaded into the turret with said one tool so that the tool is received within the workpiece when the workpiece is raised by the lifting module.

Embodiment 34 is an apparatus according to embodiment 33 wherein the receiving and aligning means comprises a back stop on the platform having a channel or groove into which the workpiece is loaded so as to position the workpiece under said one tool.

Embodiment 35 is an apparatus according to embodiment 34 wherein the back stop is fixed relative to the platform.

Embodiment 36 is an apparatus according to embodiment 34 wherein the back stop is movable relative to the platform.

Embodiment 37 is an apparatus according to embodiment 36 wherein the back stop is co-operable with a stationary cam that extends about the turret for controlling movement of the back stop.

Embodiment 38 is an apparatus according to embodiment 37 wherein the back stop is mounted at the upper end of a shaft that extends parallel to the central axis of the turret and is pivotally connected to a cam follower at the lower end that engages the cam to pivot the shaft as the turret rotates about the central axis relative to the cam to move the back stop.

Embodiment 39 is an apparatus according to any of embodiments 34 to 38 wherein the back stop positions the workpiece on a rotatable part of the platform, for example a disc rotatably mounted in the upper surface of platform.

Embodiment 40 is an apparatus according to any of the preceding embodiments wherein the turret is a beading turret, and the apparatus further comprises one or more further rotatable turrets, each further turret comprising at least one tool set for carrying out a forming operation on a corresponding plurality of workpieces as the turret rotates, said further turrets and beading turret being arranged for transfer of the workpiece between the turrets in sequence.

Embodiment 41 is an apparatus according to embodiment 40 wherein said at least one tool set of the one or more further turrets is selected from the group consisting of a drawing tool set, de-bossing tool set, trimming tool set, re-coning tool set and curling tool set.

Embodiment 42 is an apparatus according to embodiment 40 or embodiment 41 wherein the apparatus comprises at least four rotatable turrets including in sequence a trimming turret, a re-coning turret, a curling turret and a beading turret, and at least three transfer members for transferring the workpiece between turrets in said sequence.

Embodiment 43 is an apparatus according to embodiment 40 or embodiment 41 wherein the apparatus comprises at least five rotatable turrets including in sequence a drawing turret, a trimming turret, a re-coning turret, a curling turret and said beading turret, and at least four transfer members for transferring the workpiece between turrets in said sequence.

Embodiment 44 is a method of forming an aerosol can for a metered dose inhaler, the method including the steps of providing a turret rotatable about a central axis, providing the turret with a plurality of tool sets for carrying out a forming operation on a respective plurality of workpieces as the turret rotates, arranging each tool set to move about said central axis as the turret rotates and providing each tool set with two rotatably driven tools arranged to carry out a beading operation or a trimming operation on a workpiece.

Embodiment 45 is the method of embodiment 44 including the step of moving the tools towards each other for carrying out a beading operation or a trimming operation to engage outer and inner surfaces of the workpiece causing the workpiece to rotate to present a new portion of the workpiece to the tools until the operation is completed.

Embodiment 46 is an apparatus for forming an aerosol can, the apparatus including
a plurality of rotatable turrets arranged for transfer of a workpiece between said turrets in sequence,
each turret having at least one tool set for carrying out a forming operation on a workpiece as the turret rotates,
means for transferring a workpiece between turrets in said sequence,
wherein at last one turret is provided with a beading tool set or a trimming tool set.

Embodiment 47 is an apparatus according to embodiment 46 wherein each turret has a plurality of tool sets operable to carry out forming operations on a plurality of workpieces as the turret rotates.

Embodiment 48 is an apparatus according to embodiment 46 or embodiment 47 wherein the tool sets are offset in the direction of rotation of the turret so that, as the turret rotates, the forming operations are staggered.

Embodiment 49 is an apparatus according to embodiment 47 or embodiment 48 wherein tool sets on the same turret are the same so that, as the turret rotates, the same forming operation is carried out on all the workpieces.

Embodiment 50 is an apparatus according to any of embodiments 47 to 49 wherein different turrets have different tool sets for carrying out different forming operations.

Embodiment 51 is an apparatus according to any of embodiments 46 to 50 wherein the rotatable turrets include tool sets for carrying out forming operations including some or all of drawing, trimming, re-coning, curling, beading a workpiece to produce a can for assembly with a valve.

Embodiment 52 is an apparatus according to any of embodiments 46 to 51 wherein each tool set on at least some of the turrets has an associated lifting module arranged to receive a workpiece at an inlet position, raise the lifting workpiece for the tool set to carry out the forming operation and lower the workpiece for ejection at an outlet position as the turret rotates.

Embodiment 53 is an apparatus according to embodiment 52 wherein movement of the lifting module is controlled by a cam system as the turret rotates.

Embodiment 54 is an apparatus according to any of embodiments 46 to 53 wherein each tool set on at least some of the turrets is operable by a cam system as the turret rotates.

Embodiment 55 is an apparatus according to embodiment 54 wherein the lifting module cam system and the tool set cam system are synchronised to position the workpiece for the tool set to carry out the forming operation.

Embodiment 56 is an apparatus according to embodiment 51 wherein a beading tool set comprises a mandrel on which the workpiece is located and a pressure wheel that is radially movable relative to the mandrel to shape the sidewall of the workpiece between co-operating profiles on the pressure wheel and mandrel to form the bead.

Embodiment 57 is an apparatus according to embodiment 56 wherein the pressure wheel and mandrel are rotatable and the rotational speeds are controlled to reduce or eliminate frictional slippage during the beading operation.

Embodiment 58 is an apparatus according to embodiment 51 wherein a trimming tool set comprises a spindle on which the workpiece is located and a cutting wheel that is radially movable relative to the spindle to cut the sidewall of the workpiece.

Embodiment 59 is an apparatus according to embodiment 58 wherein the cutting wheel and spindle are rotatable and the rotational speeds are controlled to reduce or eliminate frictional slippage during the trimming operation.

Embodiment 60 is an apparatus according to any of embodiments 46 to 59 wherein each turret is driven by a motor.

Embodiment 61 is an apparatus according to embodiment 60 wherein the turrets are arranged in pairs with each pair being driven by a common motor.

Embodiment 62 is an apparatus according to embodiment 60 or embodiment 61 wherein the turret motors are synchronised.

Embodiment 63 is an apparatus according to any of embodiments 60 to 62 wherein the turret motors comprise stepper motors.

Embodiment 64 is a method of forming an aerosol can, the method comprising the steps of:
providing a plurality of rotatable turrets,
arranging said turrets for transfer of a workpiece between said turrets in sequence,
loading a workpiece into a first said turret in said sequence and carrying out a forming operation on said workpiece as said turret rotates,
transferring said workpiece from said first turret to a successive turret in said sequence and carrying out a forming operation on said workpiece as said turret rotates, and
unloading said workpiece from a final said turret in said sequence;
wherein a forming operation at one of said turrets in said sequence comprises a beading operation or a trimming operation.

Embodiment 65 is the method of embodiment 64 wherein each turret is configured to carry out forming operations on a plurality of workpieces as the turret rotates.

Embodiment 66 is the method of embodiment 65 wherein each turret has a plurality of tool sets operable to carry out forming operations on several workpieces as the turret rotates.

Embodiment 67 is the method of embodiment 66 wherein the tool sets are offset in the direction of rotation of the turret so that, as the turret rotates, the forming operations are staggered.

Embodiment 68 is the method of embodiment 67 wherein tool sets on the same turret are the same so that, as the turret rotates, the same forming operation is carried out on all the workpieces.

Embodiment 69 is the method of embodiment 67 or embodiment 68 wherein different turrets have different tool sets for carrying out different forming operations.

While the invention has been described with reference to the best mode of operation currently known to the inventors, it will be understood that the invention is not limited thereto and that various changes can be made without departing from the principles and concepts described herein. The invention includes all such changes and embraces any of the features described herein separately or in any combination.

The invention claimed is:

1. Apparatus for forming an aerosol can for a metered dose inhaler, the apparatus including a turret rotatable about a central axis and having a plurality of tool sets for carrying out a forming operation on a respective plurality of workpieces as the turret rotates, wherein each tool set is configured and arranged to move about said central axis as the turret rotates and wherein each tool set comprises two rotatably driven tools that are configured and arranged to carry out a the forming operation which is a beading operation or a trimming operation on a workpiece, and the turret has drive means comprising a drive ring that surrounds the turret and a respective drive shaft for each tool of each tool set, each drive shaft driven by the drive ring for rotating each tool of each tool set.

2. Apparatus according to claim 1 wherein the turret is a beading turret wherein said two rotatably driven tools of each tool set include a pressure wheel tool and a mandrel tool for performing a beading operation on a workpiece by rotatively nipping the workpiece between complementary profiles of the tools.

3. Apparatus according to claim 1 wherein one of the tools of each tool set is positioned within the workpiece (the internal tool) and the relative movement between the tools brings the other tool into contact with an outer surface of the workpiece (the external tool) to trap locally the wall of the workpiece between the tools for carrying out a beading operation or a trimming operation on the wall of the workpiece;
wherein co-operating profiles of the tools run at the same velocity to reduce or eliminate slippage against the workpiece;
wherein each tool set has an associated lifting module arranged to receive a workpiece loaded into the turret and to raise the workpiece to position one tool of the tool set within the workpiece for a beading operation or a trimming operation, and, after the beading operation or trimming operation, the lifting module is arranged to lower the workpiece to clear said one tool so that the workpiece can be unloaded from the turret;
wherein the rotatably driven tools of each tool set are mounted for rotation about axes parallel to each other and to the central axis and the tools are relatively movable in a direction transverse to the central axis only for performing a beading operation or a trimming operation on a workpiece according to whether the turret is beading turret or a trimming turret.

4. Apparatus according to claim 1 wherein each tool set is co-operable with a stationary cam that extends about the turret for controlling relative movement of the tools for performing a beading operation or trimming operation on a workpiece.

5. Apparatus according to claim 4 wherein said two rotatably driven tools of each tool set are biased away from each other and the tool set includes a cam follower co-operable with the stationary cam for relatively moving said two rotatably driven tools towards each other for carrying out a beading operation or a trimming operation.

6. Apparatus according to claim 5 wherein the cam follower is pivotally mounted and is adjustable to vary the relative movement of said two rotatably driven tools towards each other.

7. Apparatus according to claim 4 wherein the tool sets are positioned in the vicinity of, preferably adjacent to, the stationary cam such that the stationary cam and tools of each tool set are arranged in a generally horizontal plane and the cam is configured to control relative movement between the tools of each tool set radially with respect to the central axis of the turret.

8. Apparatus according to claim 7 wherein the tools of each tool set are both movable towards and away from each other for performing a beading operation or a trimming operation;

wherein the position of one of the tools of each tool set is fixed relative to the central axis of the turret and the position of other tool is movable relative to the central axis of the turret towards and away from the fixed tool for performing a beading operation or a trimming operation.

9. Apparatus according to claim 1 wherein the drive shafts for the tools of each tools set are configured to accommodate relative movement of the tools while maintaining the rotational axes of the tools parallel to each other and to the central axis of the turret;

wherein one or both drive shafts of a tool set includes one or more flexible couplings to accommodate angular and/or axial movement of the drive shafts;

wherein the tools of each tool set are mounted at a lower end of the drive shafts that are rotatably received in respective tool blocks defining the rotational axes of the tools.

* * * * *

UNITED STATES PATENT AND TRADEMARK OFFICE
CERTIFICATE OF CORRECTION

PATENT NO. : 9,643,229 B2
APPLICATION NO. : 13/876486
DATED : May 9, 2017
INVENTOR(S) : Paul Wilson Page 1 of 1

It is certified that error appears in the above-identified patent and that said Letters Patent is hereby corrected as shown below:

In the Specification

Column 8, Line 27, Delete "invention:" and insert -- invention; --, therefor.

Column 9, Line 9, Delete "does" and insert -- dose --, therefor.

Column 12, Line 20, Delete "27a, 27b;" and insert -- 27a,27b; --, therefor.

In the Claims

Column 24, Line 3, In Claim 1, after "a" delete "the".

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*